US010088153B2

(12) United States Patent
Colannino et al.

(10) Patent No.: US 10,088,153 B2
(45) Date of Patent: Oct. 2, 2018

(54) RADIANT WALL BURNER INCLUDING PERFORATED FLAME HOLDERS

(71) Applicant: ClearSign Combustion Corporation, Seattle, WA (US)

(72) Inventors: Joseph Colannino, Bellevue, WA (US); Douglas W. Karkow, Des Moines, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 141 days.

(21) Appl. No.: 15/345,795

(22) Filed: Nov. 8, 2016

(65) Prior Publication Data
US 2017/0184303 A1 Jun. 29, 2017

Related U.S. Application Data

(60) Provisional application No. 62/272,532, filed on Dec. 29, 2015.

(51) Int. Cl.
*F23D 14/14* (2006.01)
*B01J 19/00* (2006.01)
*F23D 14/26* (2006.01)

(52) U.S. Cl.
CPC .......... *F23D 14/14* (2013.01); *B01J 19/0013* (2013.01); *B01J 2219/00157* (2013.01); *F23D 14/26* (2013.01); *F23D 2203/102* (2013.01)

(58) Field of Classification Search
CPC .......... F23D 14/14; F23D 14/26; F23D 11/02; F23D 23/00
(Continued)

(56) References Cited

U.S. PATENT DOCUMENTS 2,095,065 A 10/1937 Hays
3,324,924 A 6/1967 Hailstone et al.
(Continued)

FOREIGN PATENT DOCUMENTS

CN 101046304 10/2007
WO WO 1995/000803 1/1995
(Continued)

OTHER PUBLICATIONS

Howell, J.R., et al.; "Combustion of Hydrocarbon Fuels Within Porous Inert Media," Dept. of Mechanical Engineering, The University of Texas at Austin. Prog. Energy Combust. Sci., 1996, vol. 22, p. 121-145.
(Continued)

*Primary Examiner* — Gregory Huson
*Assistant Examiner* — Nikhil Mashruwala
(74) *Attorney, Agent, or Firm* — Christopher A. Wiklof; Nicholas S. Bromer; Launchpad IP, Inc.

(57) ABSTRACT

A cracking furnace includes a combustion volume defined in part by a burner wall having a refractory lining. A plurality of perforated flame holders is arranged in an array that is spaced away from the wall, with fuel input faces facing the wall. Each of a plurality of fuel nozzles is positioned and configured to emit a fuel stream toward the input face of a respective one of the plurality of perforated flame holders. Combustion reactions, supported by the fuel streams emitted by the fuel nozzles, and held by the flame holders, release heat, which is emitted by the flame holders as thermal (blackbody) radiation, a portion of which impinges upon, and heats the inner face of the refractory lining. Thermal radiation from the flame holders and the wall impinges upon a load positioned in the approximate center of the combustion volume, between burner walls.

15 Claims, 13 Drawing Sheets

(58) Field of Classification Search
USPC .................. 431/7, 326, 328; 126/92 AC
See application file for complete search history.

(56) References Cited

U.S. PATENT DOCUMENTS

| | | | |
|---|---|---|---|
| 3,439,996 | A | 4/1969 | Lherault et al. |
| 4,021,188 | A | 5/1977 | Yamagishi et al. |
| 4,081,958 | A | 4/1978 | Schelp |
| 4,408,461 | A | 10/1983 | Bruhwiler et al. |
| 4,413,976 | A | 11/1983 | Scherer et al. |
| 4,483,673 | A | 11/1984 | Murai et al. |
| 4,588,373 | A | 5/1986 | Tonon et al. |
| 4,643,667 | A | 2/1987 | Fleming |
| 4,673,349 | A | 6/1987 | Abe et al. |
| 4,752,213 | A | 6/1988 | Grochowski et al. |
| 4,850,862 | A * | 7/1989 | Bjerklie ............... F23D 14/16 431/115 |
| 4,906,180 | A | 3/1990 | Dvorak |
| 4,919,609 | A * | 4/1990 | Sarkisian ............. F23D 14/12 431/328 |
| 5,326,257 | A | 7/1994 | Taylor et al. |
| 5,409,375 | A | 4/1995 | Butcher |
| 5,439,372 | A | 8/1995 | Duret et al. |
| 5,441,402 | A | 8/1995 | Reuther et al. |
| 5,641,282 | A | 6/1997 | Lee et al. |
| 5,993,192 | A | 11/1999 | Schmidt et al. |
| 6,997,701 | B2 | 2/2006 | Volkert et al. |
| 9,377,190 | B2 | 6/2016 | Karkow et al. |
| 9,388,981 | B2 | 7/2016 | Karkow et al. |
| 9,447,965 | B2 | 9/2016 | Karkow et al. |
| 9,797,595 | B2 * | 10/2017 | Karkow ............... F23C 99/001 |
| 9,885,476 | B2 * | 2/2018 | Le Mer ............... F23D 14/14 |
| 2001/0036610 | A1 * | 11/2001 | Wood .................. F23D 14/14 431/328 |
| 2003/0054313 | A1 | 3/2003 | Rattner et al. |
| 2006/0141413 | A1 | 6/2006 | Masten et al. |
| 2010/0066846 | A1 * | 3/2010 | Sarwari ............... H04N 5/232 348/218.1 |
| 2010/0178219 | A1 | 7/2010 | Verykios et al. |
| 2012/0164590 | A1 | 6/2012 | Mach |
| 2012/0231398 | A1 | 9/2012 | Carpentier et al. |
| 2013/0273485 | A1 * | 10/2013 | Lenoir ................ F23D 14/14 431/329 |
| 2015/0118629 | A1 | 4/2015 | Colannino et al. |
| 2015/0276217 | A1 | 10/2015 | Karkow et al. |
| 2015/0285491 | A1 | 10/2015 | Karkow et al. |
| 2015/0316261 | A1 | 11/2015 | Karkow et al. |
| 2015/0330625 | A1 | 11/2015 | Karkow et al. |
| 2015/0362177 | A1 | 12/2015 | Krichtafovitch et al. |
| 2015/0362178 | A1 | 12/2015 | Karkow et al. |
| 2015/0369477 | A1 | 12/2015 | Karkow et al. |
| 2016/0003471 | A1 | 1/2016 | Karkow et al. |
| 2016/0018103 | A1 | 1/2016 | Karkow et al. |
| 2016/0025333 | A1 | 1/2016 | Karkow et al. |
| 2016/0025374 | A1 | 1/2016 | Karkow et al. |
| 2016/0025380 | A1 | 1/2016 | Karkow et al. |
| 2016/0046524 | A1 | 2/2016 | Colannino et al. |
| 2016/0091200 | A1 | 3/2016 | Colannino et al. |
| 2016/0230984 | A1 | 8/2016 | Colannino et al. |
| 2016/0238240 | A1 | 8/2016 | Colannino et al. |
| 2016/0238242 | A1 | 8/2016 | Karkow et al. |
| 2016/0238277 | A1 | 8/2016 | Colannino et al. |
| 2016/0238318 | A1 | 8/2016 | Colannino et al. |
| 2016/0245509 | A1 | 8/2016 | Karkow et al. |
| 2016/0276212 | A1 | 10/2016 | Rutkowski et al. |
| 2016/0290639 | A1 | 10/2016 | Karkow et al. |
| 2016/0298838 | A1 | 10/2016 | Karkow et al. |
| 2016/0305660 | A1 | 10/2016 | Colannino et al. |
| 2017/0067633 | A1 * | 3/2017 | Cowan ................ F23D 14/14 |
| 2017/0122555 | A1 * | 5/2017 | Owens ............... F23D 14/145 |
| 2018/0003378 | A1 * | 1/2018 | Karkow ............... F23D 14/84 |
| 2018/0038588 | A1 * | 2/2018 | Karkow ............... F23D 14/14 |
| 2018/0080648 | A1 * | 3/2018 | Karkow ............... F23M 5/025 |
| 2018/0087774 | A1 * | 3/2018 | Karkow ............... F23N 1/005 |

FOREIGN PATENT DOCUMENTS

| | | |
|---|---|---|
| WO | WO 2014/127311 | 8/2014 |
| WO | WO 2015/042614 | 3/2015 |
| WO | WO 2015/042615 | 3/2015 |
| WO | WO 2015/112950 | 7/2015 |
| WO | WO 2015/123149 | 8/2015 |
| WO | WO 2015/123381 | 8/2015 |
| WO | WO 2015/123670 | 8/2015 |
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/007564 | 1/2016 |
| WO | WO 2016/105489 | 6/2016 |
| WO | WO 2016/133934 | 8/2016 |
| WO | WO 2016/133936 | 8/2016 |
| WO | WO 2016/134061 | 8/2016 |
| WO | WO 2016/134068 | 8/2016 |
| WO | WO 2016/141362 | 9/2016 |

OTHER PUBLICATIONS

Arnold Schwarzenegger, "A Low NOx Porous Ceramics Burner Performance Study," California Energy Commission Public Interest Energy Research Program, Dec. 2007, San Diego State University Foundation, p. 5.

* cited by examiner

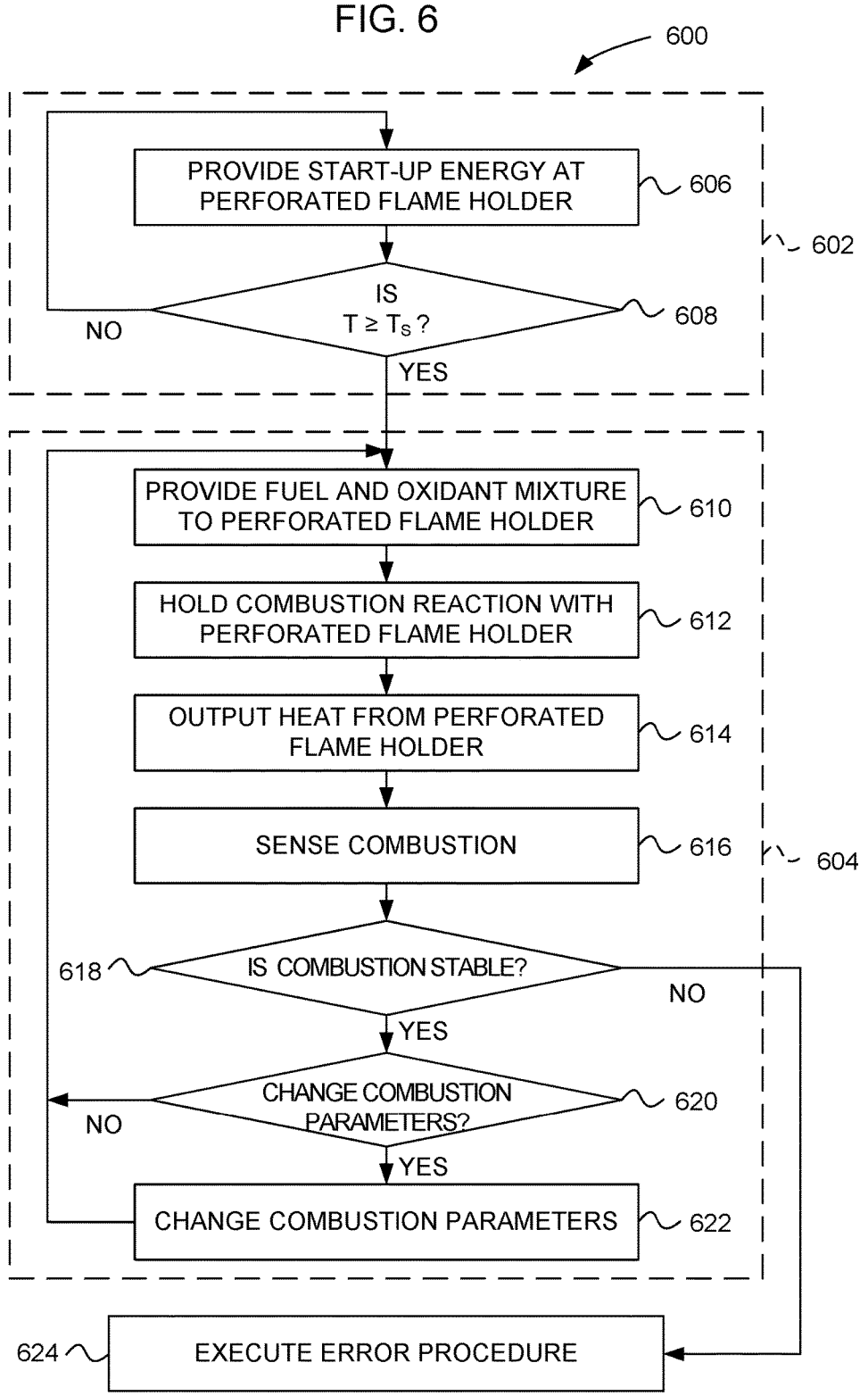

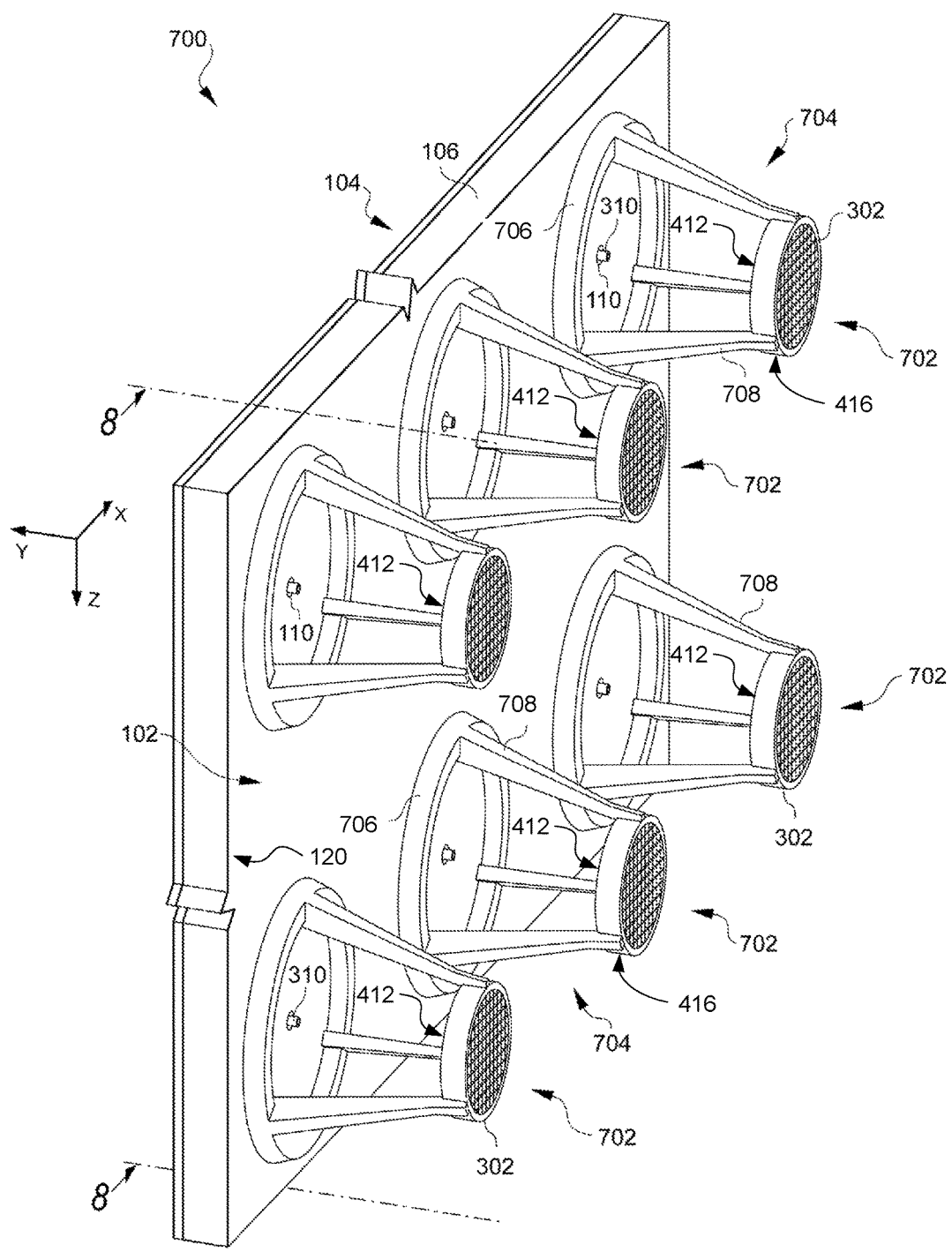

ically, with the heat load positioned along the central axis, and wall burners surrounding the load on the cylindrical walls.

FIG. 2 is a side view of a portion of a cracking furnace 200 of another design, according to known principles. The furnace 200 includes a combustion volume 102 defined in part by a wall 202 that includes tiles or panels 204 of refractory material, fixed to the wall 202 at an angle, relative to a vertical axis Z. Wall burners 206 extend into the combustion volume 102 via apertures 110, and include vertically-oriented nozzles 208. In the example shown, the apertures 110 include angled portions 210 that emerge from a top face 212 of the refractory panels 204. In other cases, the panels 204 may be notched, a space may be provided between the panels, or other structures may be used to enable placement of the nozzle 208 in a position that generally corresponds to that shown. The wall burners 206 of the pictured example each include a fuel conduit 214 and an air conduit 216, through which fuel and air are introduced into the furnace 200. The fuel is emitted from the nozzle 208 while the air is introduced adjacent to the nozzle 208, where it can be entrained by the fuel exiting the nozzle 208. The mixture of fuel and air supports flames 116 that burn along faces 218 of the tilted panels 204. The inner faces 218 of the panels 204 are heated by the flames 116 to incandescence, emitting thermal radiation 118 toward a heat load within the combustion volume 102.

The wall burners shown in FIGS. 1 and 2 are only two examples of a number of wall burners that are known in the art, and employed in various types of furnaces.

RADIANT WALL BURNER INCLUDING PERFORATED FLAME HOLDERS

CROSS REFERENCE TO RELATED APPLICATIONS

The present application claims priority benefit from U.S. Provisional Patent Application No. 62/272,532, entitled "RADIANT WALL BURNER INCLUDING PERFORATED FLAME HOLDERS," filed Dec. 29, 2015; which, to the extent not inconsistent with the disclosure herein, is incorporated by reference.

BACKGROUND

Specialized furnaces are known in the art for use in pyrolysis systems, in a number of different operations. These include, for example, thermal and catalytic cracking of hydrocarbons, reforming operations, etc. Hereafter, the term cracking furnace will be used, although the principles disclosed are not limited to cracking operations. Such furnaces typically have a firebox whose walls define a combustion volume, and through which pipes extend, configured to carry a working fluid or product fluid through the combustion volume. The fluid in the pipes is the primary heat load that receives thermal energy produced within the firebox. Cracking furnaces generally employ multiple burners within a combustion volume in order to produce a uniform vertical heat flux profile, for efficient transfer of heat to the load. Many furnace designs employ arrays of wall burners distributed on opposing walls, or on all of the vertical walls of the firebox, with the heat load positioned between the arrays of burners. Cracking furnaces may also employ similar burners on top and bottom walls.

FIG. 1 is a side-sectional diagram of a portion of a cracking furnace 100, according to known principles. The furnace 100 includes a combustion volume 102 defined in part by a wall 104 with a lining 106 of refractory material. The refractory lining 106 can be in the form of bricks, tiles, large panels or slabs, etc., and typically lines all or nearly all of the walls 104 that define the combustion volume 102. Wall burners 108 are positioned in apertures 110 in the wall 104 and extend into the combustion volume 102. In the example shown, Venturi fuel jets 112 draw air into nozzle bodies 113 of the burners 108 and the fuel-air mixture is emitted from nozzle slots 114 that are spaced radially around an end portion of the wall burners 108. Flames 116, supported by the fuel-air mixture emitted from the nozzle slots 114, extend outward from the wall burners 108 in an X-Z plane lying substantially parallel with the wall 104. The flames 116 heat at least the exposed inner face 120 of the refractory lining 106 to an incandescent temperature, causing the wall 104 to produce thermal radiation 118 which propagates toward the interior of the furnace 100, where a heat load is positioned.

The majority of the thermal energy received by the load is transmitted by thermal radiation 118 emitted by the refractory lining 106, with a much smaller portion transmitted by convection currents of gaseous fluids inside the combustion volume 102, which are heated by contact with the inner face 120 and with the flames 116.

The heat load is generally positioned in the center of the combustion volume 102, with wall burners 108 positioned on two opposing walls, or on all four walls. In some systems, burners of similar design are also positioned on the floor and/or ceiling of a furnace. Some cracking furnaces are

SUMMARY

According to an embodiment, a combustion system is provided, including a combustion volume defined in part by a wall having a lining of refractory material, a plurality of perforated flame holders, arranged in an array and spaced away from the wall with input faces of each of the plurality of perforated flame holders facing the lining side of the wall, and a plurality of fuel nozzles, each positioned and configured to emit a fuel stream toward the input face of a respective one of the plurality of perforated flame holders.

Each of the plurality of perforated flame holders includes a plurality of apertures extending between the input face and an output face, and is configured to hold a majority of a combustion reaction that is supported by the respective one of the plurality of fuel nozzles.

According to an embodiment, the wall includes a plurality of apertures, with each of the plurality of fuel nozzles positioned in a respective one of the plurality of apertures.

According to an embodiment, the inner face of the wall includes a plurality of refractory panels, each lying at an angle relative to a wall plane defined by the plurality of wall panels in aggregate. According to an embodiment, each of the plurality of refractory panels is lying at a common angle, relative to the wall plane.

According to an embodiment, each of the plurality of perforated flame holders is coupled to the wall by a respective one of a plurality of flame holder support structures. According to another embodiment, each of the plurality of perforated flame holders is coupled to others of the plurality of perforated flame holders in a substantially planar array, suspended to hang in a plane that lies substantially parallel to a wall plane defined by the wall.

According to an embodiment, a distance between the input face of each of the plurality of perforated flame holders and the inner face of the wall is selected such that, during normal operation of the combustion system, an average strength, per unit of surface area, of thermal radiation emitted by the input face and impinging on the inner face of the wall in a first region, directly opposite the input face, is substantially less than an average strength of thermal radiation emitted by the input face and impinging on the inner face of the wall in a second region contiguous to and surrounding the first region and extending outward from the first region a distance approximately equal to a width of the perforated flame holder.

According to an embodiment, the combustion system includes a second wall opposite the first wall, together with a respective plurality of perforated flame holders and fuel nozzles, as defined with reference to one or more embodiments, above.

BRIEF DESCRIPTION OF THE DRAWINGS

FIG. 6 is a flow chart showing a method for operating a burner system including a perforated flame holder, according to an embodiment.

FIG. 7 is a perspective view of a portion of a wall of a cracking furnace, according to an embodiment.

DETAILED DESCRIPTION

Figure 1:
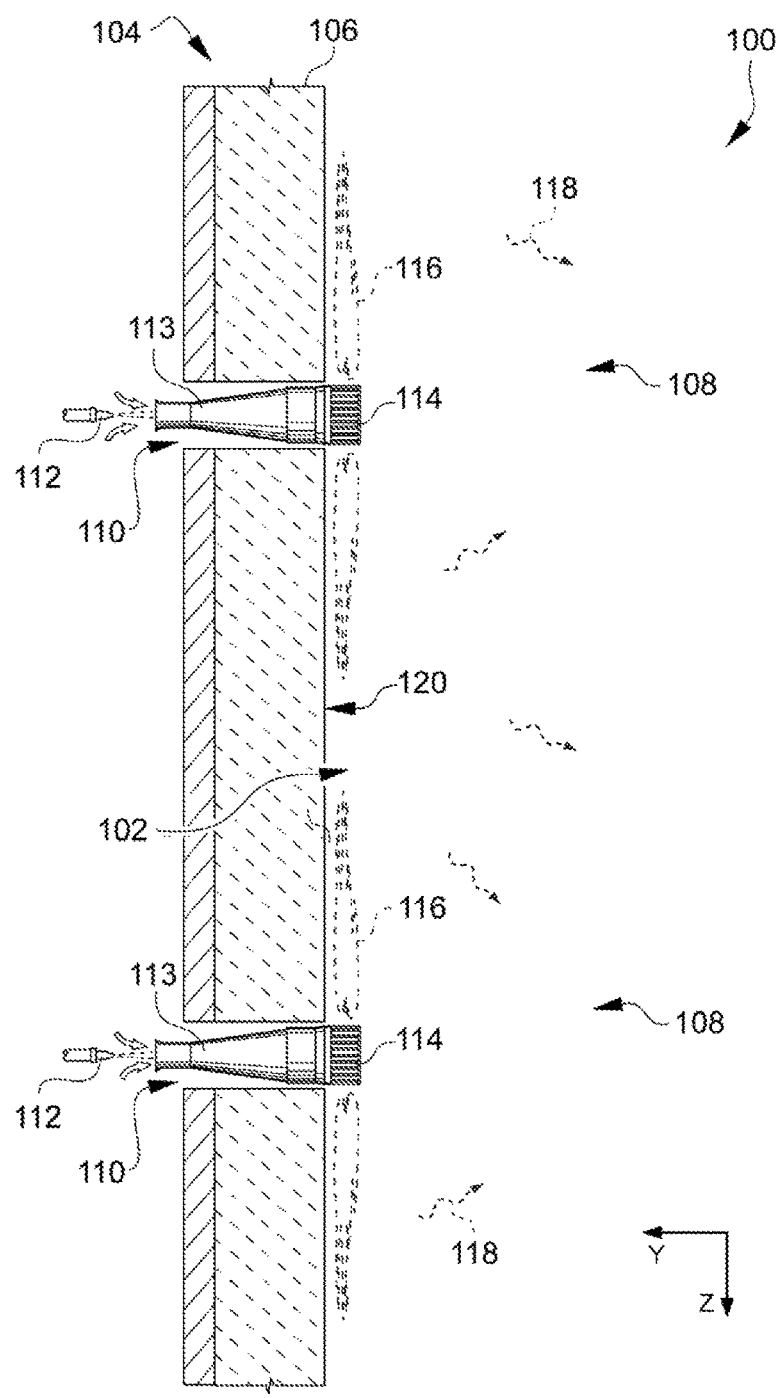
FIG. 1 is a side-sectional diagram of a portion of a cracking furnace, according to known principles.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 3:
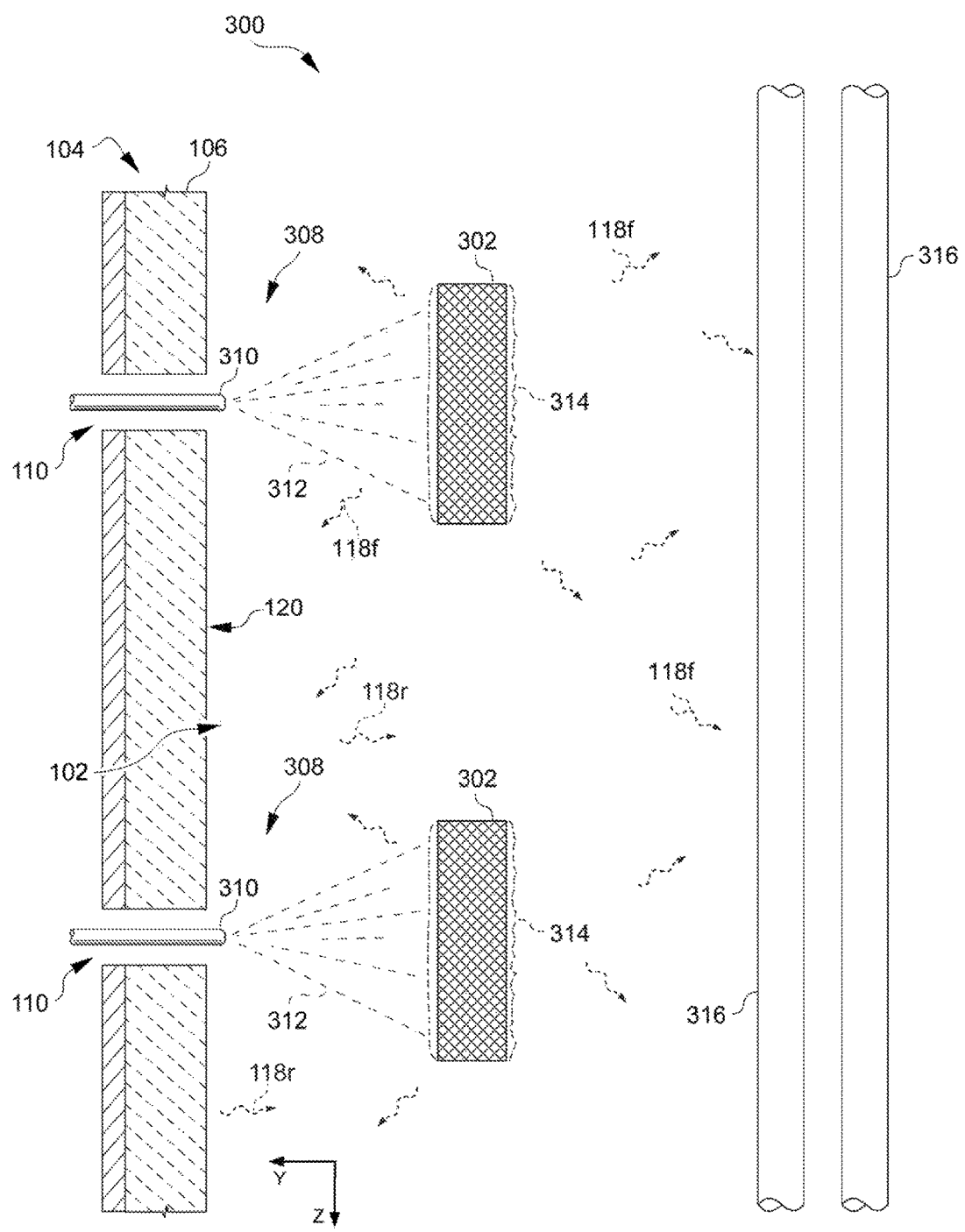
FIG. 3 is a simplified diagram of a cracking furnace, according to an embodiment, which includes a plurality of perforated flame holders.

FIG. 3 is a simplified diagram of a cracking furnace 300, according to an embodiment, which includes a plurality of perforated flame holders 302. As used herein, the terms perforated flame holder, perforated reaction holder, porous flame holder, and porous reaction holder shall be considered synonymous unless further definition is provided. The furnace 300 includes a combustion volume 102 defined in part by a wall 104 with a lining 106 of refractory material. Wall burners 308 include nozzles 310 that extend into the combustion volume 102 via apertures 110 in the wall 104. Each of the plurality of perforated flame holders 302 is positioned opposite a respective one of the nozzles 310. The nozzles 310 are configured to emit fuel streams 312 toward the respective flame holders 302, which are configured to hold respective combustion reactions 314 supported by the corresponding fuel stream 312.

According to an embodiment, the apertures 110 are sized and configured to admit sufficient air by natural aspiration, during normal operation of the furnace 300, to support the combustion reactions 314. According to another embodiment, a forced-air system is provided, configured to drive air through the apertures 110 at a rate that adequately supports the combustion reactions 314.

As explained in detail below with reference to FIGS. 4 and 5, the perforated flame holders 302 are configured to hold a majority of the combustion reaction 314 within apertures 410 or porosities of the flame holder 302. Most of the energy that is output from the flame holders 302 is in the form of thermal radiation 118f, propagating outward from the flame holders 302. A portion of the thermal radiation 118f impinges directly on a heat load 316, while another portion impinges on the inner face 120 of the refractory lining 106 of the furnace 300. The inner face of the lining 106 is heated to incandescence, and re-emits the energy as thermal radiation 118r toward the load 316.

In most cases, the fuel stream 312 is substantially transparent to the wavelengths at which the thermal radiation 118 propagates. This means that, despite the very high temperatures of the surrounding surfaces, and the high heat flux density in the space between the flame holders 302 and the inner surface of the wall 104, the fuel stream 312 does not significantly increase in temperature, and is not generally susceptible to auto-ignition prior to coming in contact with one of the perforated flame holders 302 and the combustion reaction 314 held thereby.

According to an embodiment, during a phase of operation in which the combustion reaction 314 is held substantially within the apertures 110 or porosities of the flame holder 302, a velocity of fuel emitted from each nozzle 310 may be held sufficiently high that the combustion reaction 314 will not stream stabilize between the nozzle 310 and the respective perforated flame holder 302.

Figure 4:
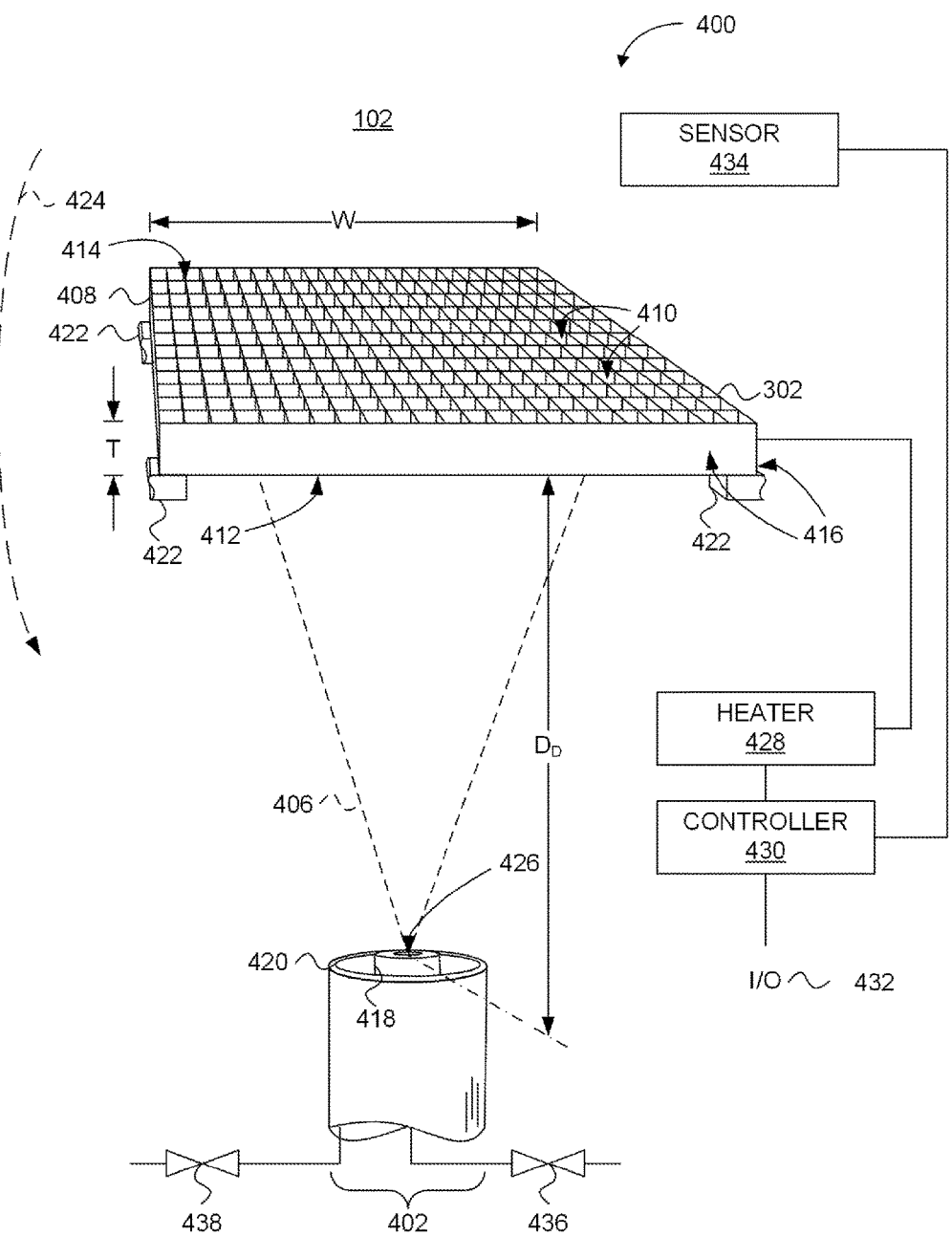
FIG. 4 is a simplified diagram of a burner system including a perforated flame holder configured to hold a combustion reaction, according to an embodiment.

FIG. 4 is a simplified diagram of a burner system 400 including a perforated flame holder 302 configured to hold a combustion reaction 314, according to an embodiment. Experiments performed by the inventors have shown that perforated flame holders 302 described herein can support very clean combustion. Specifically, in experimental use of systems 400 ranging from pilot scale to full scale, output of oxides of nitrogen (NOx) was measured to range from low single digit parts per million (ppm) down to undetectable (less than 1 ppm) concentration of NOx at the stack. These remarkable results were measured at 3% (dry) oxygen ($O_2$) concentration with undetectable carbon monoxide (CO) at stack temperatures typical of industrial furnace applications (1400-1600° F.). Moreover, these results did not require any extraordinary measures such as selective catalytic reduction (SCR), selective non-catalytic reduction (SNCR), water/steam injection, external flue gas recirculation (FGR), or other heroic extremes that may be required for conventional burners to even approach such clean combustion.

According to embodiments, the burner system 400 includes a fuel and oxidant source 402 disposed to output fuel and oxidant into a combustion volume 102 to form a fuel and oxidant mixture 406. As used herein, the terms combustion volume, combustion chamber, furnace volume, and the like shall be considered synonymous unless further definition is provided. The perforated flame holder 302 is disposed in the combustion volume 102 and positioned to receive the fuel and oxidant mixture 406.

Figure 5:
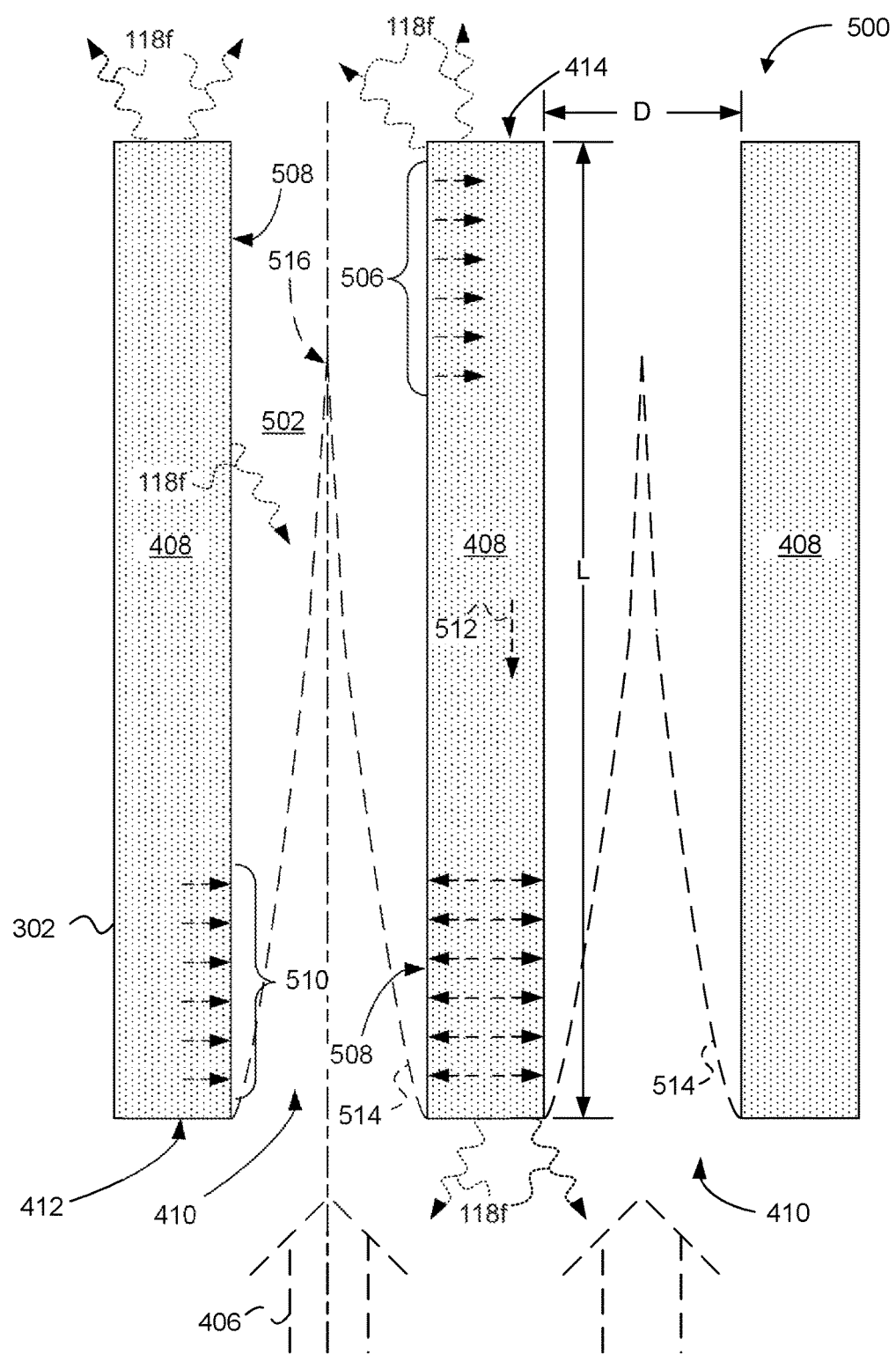
FIG. 5 is a side sectional diagram of a portion of the perforated flame holder of FIGS. 3 and 4, according to an embodiment.

FIG. 5 is a side sectional diagram 500 of a portion of the perforated flame holder 302 of FIGS. 3 and 4, according to an embodiment. Referring to FIGS. 4 and 5, the perforated flame holder 302 includes a perforated flame holder body 408 defining a plurality of perforations 410 aligned to receive the fuel and oxidant mixture 406 from the fuel and oxidant source 402. As used herein, the terms perforation, pore, aperture, elongated aperture, and the like, in the context of the perforated flame holder 302, shall be considered synonymous unless further definition is provided. The perforations 410 are configured to collectively hold a combustion reaction 502 supported by the fuel and oxidant mixture 406.

The fuel can include, for example, hydrogen, a hydrocarbon gas, a vaporized hydrocarbon liquid, or an atomized hydrocarbon liquid. The fuel can be a single species or can include a mixture of gas(es), vapor(s), and/or atomized liquid(s). For example in a process heater application, the fuel can include fuel gas or byproducts from the process that include CO, hydrogen ($H_2$), and methane ($CH_4$). In another application the fuel can include natural gas (mostly $CH_4$) or propane ($C_3H_8$). In another application, the fuel can include butane, #2 fuel oil, or #6 fuel oil. Dual fuel applications and flexible fuel applications are similarly contemplated by the inventors. The oxidant can include oxygen carried by air and/or can include another oxidant, either pure or carried by a carrier gas. The terms oxidant and oxidizer shall be considered synonymous herein.

According to an embodiment, the perforated flame holder body 408 can be bounded by an input face 412 disposed to receive the fuel and oxidant mixture 406, an output face 414 facing away from the fuel and oxidant source 402, and a peripheral surface 416 defining a lateral extent of the perforated flame holder 302. The plurality of perforations 410 which are defined by the perforated flame holder body 408 extend from the input face 412 to the output face 414. The plurality of perforations 410 can receive the fuel and oxidant mixture 406 at the input face 412. The fuel and oxidant mixture 406 can then combust in or near the plurality of perforations 410 and combustion products can exit the plurality of perforations 410 at or near the output face 414.

According to an embodiment, the perforated flame holder 302 is configured to hold a majority of the combustion reaction 502 within the perforations 410. For example, on a steady-state basis, more than half the molecules of fuel output into the combustion volume 102 by the fuel and oxidant source 402 may be converted to combustion products between the input face 412 and the output face 414 of the perforated flame holder 302. According to an alternative interpretation, more than half of the heat output by the combustion reaction 502 may be output between the input face 412 and the output face 414 of the perforated flame holder 302. Under nominal operating conditions, the perforations 410 can be configured to collectively hold at least 80% of the combustion reaction 502 between the input face 412 and the output face 414 of the perforated flame holder 302. In some experiments, the inventors produced a combustion reaction that was apparently wholly contained in the perforations 410 between the input face 412 and the output face 414 of the perforated flame holder 302. According to an alternative interpretation, the perforated flame holder 302 can support combustion between the input face 412 and output face 414 when combustion is "time-averaged." For example, during transients, such as before the perforated flame holder 302 is fully heated, or if too high a (cooling) load is placed on the system, the combustion may travel somewhat downstream from the output face 414 of the perforated flame holder 302.

While a "flame" is described in a manner intended for ease of description, it should be understood that in some instances, no visible flame is present. Combustion may occur upstream from, beside, downstream from, and within the perforations 410. In some embodiments, combustion occurs primarily within the perforations 410, and combustion heat is output primarily as thermal radiation from the perforated flame holder 302 itself. In other instances, the inventors have noted transient "huffing" wherein a visible flame momentarily ignites in a region lying between the input face 412 of the perforated flame holder 302 and the fuel source 418, within the dilution region $D_D$. Such transient huffing is generally short in duration such that, on a time-averaged basis, a majority of combustion occurs within the perforations 410 of the perforated flame holder 302, between the input face 412 and the output face 414. In still other instances, the inventors have noted apparent combustion occurring above the output face 414 of the perforated flame holder 302, but still a majority of combustion occurred within the perforated flame holder 302 as evidenced by the continued visible glow (a visible wavelength tail of blackbody radiation) from the perforated flame holder 302.

The perforated flame holder 302 can be configured to receive heat from the combustion reaction 502 and output a portion of the received heat as thermal radiation 118f to heat-receiving structures (e.g., furnace walls and/or radiant section working fluid tubes) in or adjacent to the combustion volume 102. As used herein, terms such as thermal radiation, infrared radiation, radiant heat, heat radiation, etc. are to be construed as being substantially synonymous, unless further definition is provided. Specifically, such terms refer to blackbody radiation of electromagnetic energy, primarily in infrared wavelengths.

According to an embodiment, thermal radiation 118f emitted by the perforated flame holder 302 to the surrounding environment is emitted primarily from the input and output faces 412, 414, along axes that lie between about 10 degrees and 60 degrees, relative to an axis lying normal to the respective face of the flame holder 302. This is described in more detail below, with reference to FIGS. 11 and 12.

Referring especially to FIG. 5, the perforated flame holder 302 outputs another portion of the received heat to the fuel and oxidant mixture 406 received at the input face 412 of the perforated flame holder 302. The perforated flame holder body 408 may receive heat from the (exothermic) combustion reaction 502 at least in heat receiving regions 506 of perforation walls 508. Experimental evidence has suggested to the inventors that the position of the heat receiving regions 506, or at least the position corresponding to a maximum rate of receipt of heat, can vary along the length of the perforation walls 508. In some experiments, the location of maximum receipt of heat was apparently between ⅓ and ½ of the distance from the input face 412 to the output face 414 (i.e., somewhat nearer to the input face 412 than to the output face 414). The inventors contemplate that the heat receiving regions 506 may lie nearer to the output face 414 of the perforated flame holder 302 under other conditions. Most probably, there is no clearly defined edge of the heat receiving regions 506 (or for that matter, heat output regions 510, described below). For ease of understanding, the heat receiving regions 506 and the heat output regions 510 will be described as particular regions 506, 510.

The perforated flame holder body 408 can be characterized by a heat capacity. The perforated flame holder body 408 may hold heat from the combustion reaction 502 in an amount corresponding to the heat capacity times temperature rise, and transfer the heat from the heat receiving regions 506 to heat output regions 510 of the perforation walls 508. Generally, the heat output regions 510 are nearer to the input face 412 than are the heat receiving regions 506. According to one interpretation, the perforated flame holder body 408 can transfer heat from the heat receiving regions 506 to the heat output regions 510 via thermal radiation, depicted graphically as 118f. According to another interpretation, the perforated flame holder body 408 can transfer heat from the heat receiving regions 506 to the heat output regions 510 via heat conduction along heat conduction paths 512. The inventors contemplate that both radiation and conduction heat transfer mechanisms may be operative in transferring heat from the heat receiving regions 506 to the heat output regions 510. In this way, the perforated flame holder 302 may act as a heat source to maintain the combustion reaction 502, even under conditions where a combustion reaction would not be stable when supported from a conventional flame holder.

The inventors believe that the perforated flame holder 302 causes the combustion reaction 502 to occur within thermal boundary layers 514 formed adjacent to walls 508 of the perforations 410. As the relatively cool fuel and oxidant mixture 406 approaches the input face 412, the flow is split into portions that respectively travel through individual perforations 410. The hot perforated flame holder body 408 transfers heat to the fluid, notably within thermal boundary layers 514 that progressively thicken as more and more heat is transferred to the incoming fuel and oxidant mixture 406. After reaching a combustion temperature (e.g. the auto-ignition temperature of the fuel), the reactants continue to flow while a chemical ignition delay time elapses, over which time the combustion reaction 502 occurs. Accordingly, the combustion reaction 502 is shown as occurring within the thermal boundary layers 514. As flow progresses, the thermal boundary layers 514 merge at a merger point 516. Ideally, the merger point 516 lies between the input face 412 and output face 414 that defines the ends of the perforations 410. At some point, the combustion reaction 502 causes the flowing gas (and plasma) to output more heat to the body 408 than it receives from the body 408. The heat is received at the heat receiving region 506, is held by the body 408, and is transported to the heat output region 510 nearer to the input face 412, where the heat recycles into the cool reactants (and any included diluent) to raise them to the combustion temperature.

In an embodiment, the plurality of perforations 410 are each characterized by a length L defined as a reaction fluid propagation path length between the input face 412 and the output face 414 of the perforated flame holder 302. The reaction fluid includes the fuel and oxidant mixture 406 (optionally including nitrogen, flue gas, and/or other "non-reactive" species), reaction intermediates (including transition states in a plasma that characterizes the combustion reaction), and reaction products.

The plurality of perforations 410 can be each characterized by a transverse dimension D between opposing perforation walls 508. The inventors have found that stable combustion can be maintained in the perforated flame holder 302 if the length L of each perforation 410 is at least four times the transverse dimension D of the perforation 410. In other embodiments, the length L can be greater than six times the transverse dimension D. For example, experiments have been run where L is at least eight, at least twelve, at least sixteen, and at least twenty-four times the transverse dimension D. Preferably, the length L is sufficiently long for thermal boundary layers 514 formed adjacent to the perforation walls 508 in a reaction fluid flowing through the perforations 410 to converge at merger points 516 within the perforations 410 between the input face 412 and the output face 414 of the perforated flame holder 302. In experiments, the inventors have found L/D ratios between 12 and 48 to work well (i.e., produce low NOx, produce low CO, and maintain stable combustion).

The perforated flame holder body 408 can be configured to convey heat between adjacent perforations 410. The heat conveyed between adjacent perforations 410 can be selected to cause heat output from the combustion reaction 502 in a first perforation 410 to supply heat to stabilize a combustion reaction 502 in an adjacent perforation 410.

Referring especially to FIG. 4, the fuel and oxidant source 402 can further include a fuel nozzle 418, configured to output fuel, and an oxidant source 420 configured to output a fluid including the oxidant. For example, the fuel nozzle 418 can be configured to output pure fuel. The oxidant source 420 can be configured to output combustion air carrying oxygen.

The perforated flame holder 302 can be held by a perforated flame holder support structure 422 configured to hold the perforated flame holder 302 a distance $D_D$ away from the fuel nozzle 418. The fuel nozzle 418 can be configured to emit a fuel jet selected to entrain the oxidant to form the fuel and oxidant mixture 406 as the fuel jet and oxidant travel along a path to the perforated flame holder 302 through a dilution distance $D_D$ between the fuel nozzle 418 and the perforated flame holder 302. Additionally or alternatively (particularly when a blower is used to deliver oxidant combustion air), the oxidant or combustion air source 420 can be configured to entrain the fuel and the fuel and oxidant travel through the dilution distance $D_D$. In some embodiments, a flue gas recirculation path 424 can be provided. Additionally or alternatively, the fuel nozzle 418 can be configured to emit a fuel jet selected to entrain the oxidant and to entrain flue gas as the fuel jet travels through a dilution distance $D_D$ between the fuel nozzle 418 and the input face 412 of the perforated flame holder 302.

The fuel nozzle 418 can be configured to emit the fuel through one or more fuel orifices 426 having a dimension that is referred to as "nozzle diameter." The perforated flame holder support structure 422 can support the perforated flame holder 302 to receive the fuel and oxidant mixture 406 at a distance $D_D$ away from the fuel nozzle 418 greater than 20 times the nozzle diameter. In another embodiment, the perforated flame holder 302 is disposed to receive the fuel and oxidant mixture 406 at a distance $D_D$ away from the fuel nozzle 418 between 100 times and 1100 times the nozzle diameter. Preferably, the perforated flame holder support structure 422 is configured to hold the perforated flame holder 302 about 200 times the nozzle diameter or more away from the fuel nozzle 418. When the fuel and oxidant mixture travels about 200 times the nozzle diameter or more, the mixture is sufficiently homogenized to cause the combustion reaction to output minimal NOx.

The combustion air source can include a blower configured to force air through the fuel and air source 402.

The support structure 422 can be configured to support the perforated flame holder 302 from a floor or wall (not shown) of the combustion volume 102, for example. In another embodiment, the support structure 422 supports the perforated flame holder 302 from the fuel and oxidant source 402. Alternatively, the support structure 422 can suspend the perforated flame holder 302 from an overhead structure (such as a flue, in the case of an up-fired system). The support structure 422 can support the perforated flame holder 302 in various orientations and directions.

The perforated flame holder 302 can include a single perforated flame holder body 408. In another embodiment, the perforated flame holder 302 can include a plurality of adjacent perforated flame holder sections that collectively provide a tiled perforated flame holder 302.

The perforated flame holder support structure 422 can be configured to support the plurality of perforated flame holder sections. The perforated flame holder support structure 422 can include a metal superalloy, a cementatious, and/or ceramic refractory material. In an embodiment, the plurality of adjacent perforated flame holder sections can be joined with a fiber reinforced refractory cement.

The perforated flame holder 302 can have a width dimension W between opposite sides of the peripheral surface 416 at least twice a thickness dimension T between the input face 412 and the output face 414. In another embodiment, the perforated flame holder 302 can have a width dimension W between opposite sides of the peripheral surface 416 at least three times, at least six times, or at least nine times a thickness dimension T between the input face 412 and the output face 414 of the perforated flame holder 302.

In an embodiment, the perforated flame holder 302 can have a width dimension W less than a width of the combustion volume 102. This can allow the flue gas circulation path 424 from above to below the perforated flame holder 302 to lie between the peripheral surface 416 of the perforated flame holder 302 and the combustion volume wall (not shown).

Referring again to both FIGS. 4 and 5, the perforations 410 can include elongated squares, each of the elongated squares has a transverse dimension D between opposing sides of the squares. In another embodiment, the perforations 410 can include elongated hexagons, each of the elongated hexagons has a transverse dimension D between opposing sides of the hexagons. In another embodiment, the perforations 410 can include hollow cylinders, each of the hollow cylinders has a transverse dimension D corresponding to a diameter of the cylinders. In another embodiment, the perforations 410 can include truncated cones, each of the truncated cones has a transverse dimension D that is rotationally symmetrical about a length axis that extends from the input face 412 to the output face 414. The perforations 410 can each have a lateral dimension D equal to or greater than a quenching distance of the fuel based on standard reference conditions.

In one range of embodiments, each of the plurality of perforations 410 has a lateral dimension D between 0.05 inch and 1.0 inch. Preferably, each of the plurality of perforations 410 has a lateral dimension D between 0.1 inch and 0.5 inch. For example the plurality of perforations 410 can each have a lateral dimension D of about 0.2 to 0.4 inch.

The void fraction of the perforated flame holder 302 is defined as the total volume of all perforations 410 in a section of the perforated flame holder 302 divided by a total volume of the perforated flame holder 302 including body 408 and perforations 410. The perforated flame holder 302 should have a void fraction between 0.10 and 0.90. In an embodiment, the perforated flame holder 302 can have a void fraction between 0.30 and 0.80. In another embodiment, the perforated flame holder 302 can have a void fraction of about 0.70. Using a void fraction of about 0.70 was found to be especially effective for producing very low NOx.

The perforated flame holder 302 can be formed from a fiber reinforced cast refractory material and/or a refractory material such as an aluminum silicate material. For example, the perforated flame holder 302 can be formed from mullite or cordierite. Additionally or alternatively, the perforated flame holder body 408 can include a metal superalloy such as INCONEL® or HASTELLOY®. The perforated flame holder body 408 can define a honeycomb.

The inventors have found that the perforated flame holder 302 can be formed from VERSAGRID® ceramic honeycomb, available from Applied Ceramics, Inc. of Doraville, S.C.

The perforations 410 can be parallel to one another and normal to the input and output faces 412, 414. In another embodiment, the perforations 410 can be parallel to one another and formed at an angle relative to the input and output faces 412, 414. In another embodiment, the perforations 410 can be non-parallel to one another. In another embodiment, the perforations 410 can be non-parallel to one another and non-intersecting. In another embodiment, the perforations 410 can be intersecting. The body 408 can be one piece or can be formed from a plurality of sections.

In another embodiment, the perforated flame holder 302 may be formed from reticulated fibers formed from an extruded ceramic material. The term "reticulated fibers" refers to a netlike structure.

In another embodiment, the perforated flame holder 302 can include a plurality of tubes or pipes bundled together. The plurality of perforations 410 can include hollow cylinders and can optionally also include interstitial spaces between the bundled tubes. In an embodiment, the plurality of tubes can include ceramic tubes. Refractory cement can be included between the tubes and configured to adhere the tubes together. In another embodiment, the plurality of tubes can include metal (e.g., superalloy) tubes. The plurality of tubes can be held together by a metal tension member circumferential to the plurality of tubes and arranged to hold the plurality of tubes together. The metal tension member can include stainless steel, a superalloy metal wire, and/or a superalloy metal band.

The perforated flame holder body 408 can alternatively include stacked perforated sheets of material, each sheet having openings that connect with openings of subjacent and superjacent sheets. The perforated sheets can include perforated metal sheets, ceramic sheets and/or expanded sheets. In another embodiment, the perforated flame holder body 408 can include discontinuous packing bodies such that the perforations 410 are formed in the interstitial spaces between the discontinuous packing bodies. In one example, the discontinuous packing bodies include structured packing shapes. In another example, the discontinuous packing bodies include random packing shapes. For example, the discontinuous packing bodies can include ceramic raschig ring, ceramic Berl saddles, ceramic Intalox® saddles, and/or metal rings or other shapes (e.g. Super Raschig Rings) that may be held together by a metal cage.

The inventors contemplate various explanations for why burner systems including the perforated flame holder 302 provide such clean combustion.

In one aspect, the perforated flame holder 302 acts as a heat source to maintain a combustion reaction even under conditions where a combustion reaction would not be stable when supported by a conventional flame holder. This capability can be leveraged to support combustion using a leaner fuel-to-oxidant mixture than is typically feasible. Thus, according to an embodiment, at the point where the fuel stream 406 contacts the input face 412 of the perforated flame holder 302, an average fuel-to-oxidant ratio of the fuel stream 406 is below a (conventional) lower combustion limit of the fuel component of the fuel stream—lower combustion limit defines the lowest concentration of fuel at which a fuel/air mixture will burn when exposed to a momentary ignition source under normal atmospheric pressure and an ambient temperature of 25° C. (77° F.).

According to one interpretation, the fuel and oxidant mixtures supported by the perforated flame holder may be more fuel-lean than mixtures that would provide stable combustion in a conventional burner. Combustion near a lower combustion limit of fuel generally burns at a lower adiabatic flame temperature than mixtures near the center of the lean-to-rich combustion limit range. Lower flame temperatures generally evolve a lower concentration of NOx than higher flame temperatures. In conventional flames, too-lean combustion is generally associated with high CO concentration at the stack. In contrast, the perforated flame holder 302 and systems including the perforated flame holder 302 described herein were found to provide substantially complete combustion of CO (single digit ppm down to undetectable, depending on experimental conditions), while supporting low NOx. In some embodiments, the inventors achieved stable combustion at what was understood to be very lean mixtures (that nevertheless produced only about 3% or lower measured $O_2$ concentration at the stack). Moreover, the inventors believe perforation walls 508 may act as a heat sink for the combustion fluid. This effect may alternatively or additionally reduce combustion temperature.

According to another interpretation, production of NOx can be reduced if the combustion reaction 502 occurs over a very short duration of time. Rapid combustion causes the reactants (including oxygen and entrained nitrogen) to be exposed to NOx-formation temperature for a time too short for NOx formation kinetics to cause significant production of NOx. The time required for the reactants to pass through the perforated flame holder 302 is very short compared to a conventional flame. The low NOx production associated with perforated flame holder combustion may thus be related to the short duration of time required for the reactants (and entrained nitrogen) to pass through the perforated flame holder 302.

Since CO oxidation is a relatively slow reaction, the time for passage through the perforated flame holder 302 (perhaps plus time passing toward the flue from the perforated flame holder 302) is apparently sufficient and at sufficiently elevated temperature, in view of the very low measured (experimental and full scale) CO concentrations, for oxidation of CO to carbon dioxide ($CO_2$).

As discussed above, according to an embodiment, at the point where the fuel stream 406 contacts the input face 412 of the perforated flame holder 302, the average fuel-to-oxidant ratio of the fuel stream 406 is below the lower combustion limit of the fuel component of the fuel stream 406. It will be recognized that, for this to be the case, the average fuel-to-oxidant ratio of the fuel stream 406 must pass entirely through the lean-to-rich combustion limit range. That range is defined, at the upstream end, by the distance from the nozzle 418 at which the fuel stream 406 has entrained sufficient oxidant for the fuel-to-oxidant ratio to have dropped below the upper combustion limit of the fuel component of the fuel stream 406. The downstream end of the limit is defined, of course, by the distance at which the fuel stream 406 has entrained sufficient oxidant for the fuel-to-oxidant ratio to have dropped below the lower combustion limit of the fuel component of the fuel stream 406. This means that there is a range of distances from the nozzle 418 within which the fuel stream 406 is readily combustible, and could, under certain conditions, support a stable flame between the nozzle 406 and the flame holder 302.

However, in order for a stable flame to burn in the fuel stream 406 within that range—absent a flame holder of some kind—the flame must be capable of moving upstream at a speed that is equal to or greater than the speed at which the fuel stream flows in the opposite direction, at some point within the range of distances defined above. In other words, to support a stable flame, flame propagation speed must meet or exceed fuel stream velocity, somewhere within the lean-to-rich combustion limit range.

According to an embodiment, the initial fuel stream velocity, i.e., the velocity of the fuel stream 406 as it exits the nozzle 418, is selected to be sufficiently high that fuel stream velocity remains above flame propagation speed at least until it has entrained sufficient oxidant to have dropped below the lower combustion limit of the fuel component of the fuel stream 406.

The principles associated with control and selection of both initial fuel stream velocity and flame propagation speed are well understood in the art. For example, initial fuel stream velocity can be selected by controlling or compensation for a number of factors, including fuel nozzle diameter, volume, pressure, and density of the fuel, etc. For its part, flame propagation speed can be selected by controlling or compensation for a number of factors, including fuel composition, fuel-to-oxygen ratio, fuel and oxygen-to-diluent ratio, atmospheric pressure and humidity, etc. Another factor that influences fuel stream velocity is the geometry of the nozzle, in particular the dispersion angle of the fuel stream. As the fuel stream disperses, it slows. Thus, a more focused stream will retain a higher velocity. On the other hand, a more dispersed stream will entrain more air and diluents, and so will more quickly drop below the lower combustion limit.

FIG. 6 is a flow chart showing a method 600 for operating a burner system including the perforated flame holder shown and described herein. To operate a burner system including a perforated flame holder, the perforated flame holder is first heated to a temperature sufficient to maintain combustion of the fuel and oxidant mixture.

According to a simplified description, the method 600 begins with step 602, wherein the perforated flame holder is preheated to a start-up temperature, $T_S$. After the perforated flame holder is raised to the start-up temperature, the method proceeds to step 604, wherein fuel and oxidant are provided to the perforated flame holder and combustion is held by the perforated flame holder.

According to a more detailed description, step 602 begins with step 606, wherein start-up energy is provided at the perforated flame holder. Simultaneously or following providing start-up energy, a decision step 608 determines whether the temperature T of the perforated flame holder is at or above the start-up temperature, $T_S$. As long as the temperature of the perforated flame holder is below its start-up temperature, the method loops between steps 606 and 608 within the preheat step 602. In step 608, if the temperature T of at least a predetermined portion of the perforated flame holder is greater than or equal to the start-up temperature, the method 600 proceeds to overall step 604, wherein fuel and oxidant is supplied to and combustion is held by the perforated flame holder.

Step 604 may be broken down into several discrete steps, at least some of which may occur simultaneously.

Proceeding from step 608, a fuel and oxidant mixture is provided to the perforated flame holder, as shown in step 610. The fuel and oxidant may be provided by a fuel and oxidant source that includes a separate fuel nozzle and combustion air source, for example. In this approach, the fuel and combustion air are output in one or more directions selected to cause the fuel and combustion air mixture to be received by an input face of the perforated flame holder. The fuel may entrain the combustion air (or alternatively, the combustion air may dilute the fuel) to provide a fuel and oxidant mixture at the input face of the perforated flame holder at a fuel dilution selected for a stable combustion reaction that can be held within the perforations of the perforated flame holder.

Proceeding to step 612, the combustion reaction is held by the perforated flame holder.

In step 614, heat may be output from the perforated flame holder. The heat output from the perforated flame holder may be used to power an industrial process, heat a working fluid, generate electricity, or provide motive power, for example.

In optional step 616, the presence of combustion may be sensed. Various sensing approaches have been used and are contemplated by the inventors. Generally, combustion held by the perforated flame holder is very stable and no unusual sensing requirement is placed on the system. Combustion sensing may be performed using an infrared sensor, a video sensor, an ultraviolet sensor, a charged species sensor, thermocouple, thermopile, and/or other known combustion sensing apparatuses. In an additional or alternative variant of step 616, a pilot flame or other ignition source may be provided to cause ignition of the fuel and oxidant mixture in the event combustion is lost at the perforated flame holder.

Proceeding to decision step 618, if combustion is sensed not to be stable, the method 600 may exit to step 624, wherein an error procedure is executed. For example, the error procedure may include turning off fuel flow, re-executing the preheating step 602, outputting an alarm signal, igniting a stand-by combustion system, or other steps. If, in step 618, combustion in the perforated flame holder is determined to be stable, the method 600 proceeds to decision step 620, wherein it is determined if combustion parameters should be changed. If no combustion parameters are to be changed, the method loops (within step 604) back to step 610, and the combustion process continues. If a change in combustion parameters is indicated, the method 600 proceeds to step 622, wherein the combustion parameter change is executed. After changing the combustion parameter(s), the method loops (within step 604) back to step 610, and combustion continues.

Combustion parameters may be scheduled to be changed, for example, if a change in heat demand is encountered. For example, if less heat is required (e.g., due to decreased electricity demand, decreased motive power requirement, or lower industrial process throughput), the fuel and oxidant flow rate may be decreased in step 622. Conversely, if heat demand is increased, then fuel and oxidant flow may be increased. Additionally or alternatively, if the combustion system is in a start-up mode, then fuel and oxidant flow may be gradually increased to the perforated flame holder over one or more iterations of the loop within step 604.

Referring again to FIG. 4, the burner system 400 includes a heater 428 operatively coupled to the perforated flame holder 302. As described in conjunction with FIGS. 5 and 6, the perforated flame holder 302 operates by outputting heat to the incoming fuel and oxidant mixture 406. After combustion is established, this heat is provided by the combustion reaction; but before combustion is established, the heat is provided by the heater 428.

Various heating apparatuses have been used and are contemplated by the inventors. In some embodiments, the heater 428 can include a flame holder configured to support a flame disposed to heat the perforated flame holder 302. The fuel and oxidant source 402 can include a fuel nozzle 418 configured to emit a fuel stream and an air source 420 configured to output combustion air adjacent to the fuel stream. The fuel nozzle 418 and air source 420 can be configured to output the fuel stream to be progressively diluted by the combustion air. The perforated flame holder 302 can be disposed to receive a diluted fuel and air mixture 406 that supports a combustion reaction that is stabilized by the perforated flame holder 302 when the perforated flame holder 302 is at an operating temperature. A start-up flame holder, in contrast, can be configured to support a start-up flame at a location corresponding to a relatively rich fuel and air mixture that is stable without stabilization provided by the heated perforated flame holder 302.

The burner system 400 can further include a controller 430 operatively coupled to the heater 428 and to a data interface 432. For example, the controller 430 can be configured to control a start-up flame holder actuator configured to cause the start-up flame holder to hold the start-up flame when the perforated flame holder 302 needs to be pre-heated and to not hold the start-up flame when the perforated flame holder 302 is at an operating temperature (e.g., when $T \geq T_S$).

Various approaches for actuating start-up flames are contemplated. In one embodiment, the start-up flame holder includes a mechanically-actuated bluff body configured to be actuated to intercept the fuel and oxidant mixture 406 to cause heat-recycling vortices and thereby hold a start-up flame; or to be actuated to not intercept the fuel and oxidant mixture 406 to cause the fuel and oxidant mixture 406 to proceed to the perforated flame holder 302. In another embodiment, a fuel control valve, blower, and/or damper may be used to select a fuel and oxidant mixture flow rate that is sufficiently low for a start-up flame to be jet-stabilized; and upon reaching a perforated flame holder 302 operating temperature, the flow rate may be increased to "blow out" the start-up flame. In another embodiment, the heater may include an electrical power supply operatively coupled to the controller 430 and configured to apply an electrical charge or voltage to the fuel and oxidant mixture 406. An electrically conductive start-up flame holder may be selectively coupled to a voltage ground or other voltage selected to attract the electrical charge in the fuel and oxidant mixture 406. The attraction of the electrical charge was found by the inventors to cause a start-up flame to be held by the electrically conductive start-up flame holder.

In another embodiment, the heater 428 may include an electrical resistance heater configured to output heat to the perforated flame holder 302 and/or to the fuel and oxidant mixture 406. The electrical resistance heater 428 can be configured to heat up the perforated flame holder 302 to an operating temperature. The heater 428 can further include a power supply and a switch operable, under control of the controller 430, to selectively couple the power supply to the electrical resistance heater.

An electrical resistance heater 428 can be formed in various ways. For example, the electrical resistance heater 428 can be formed from KANTHAL® wire (available from Sandvik Materials Technology division of Sandvik AB of Hallstahammar, Sweden) threaded through at least a portion of the perforations 410 defined formed by the perforated flame holder body 408. Alternatively, the heater 428 can include an inductive heater, a high energy (e.g. microwave or laser) beam heater, a frictional heater, or other types of heating technologies.

Other forms of start-up apparatuses are contemplated. For example, the heater 428 can include an electrical discharge igniter or hot surface igniter configured to output a pulsed ignition to the air and fuel. Additionally or alternatively, a start-up apparatus can include a pilot flame apparatus disposed to ignite a fuel and oxidant mixture 406 that would otherwise enter the perforated flame holder 302. An electrical discharge igniter, hot surface igniter, and/or pilot flame apparatus can be operatively coupled to the controller 430, which can cause the electrical discharge igniter or pilot flame apparatus to maintain combustion of the fuel and oxidant mixture 406 in or upstream from the perforated flame holder 302 before the perforated flame holder 302 is heated sufficiently to maintain combustion.

The burner system 400 can further include a sensor 434 operatively coupled to the control circuit 430. The sensor 434 can include a heat sensor configured to detect infrared radiation or a temperature of the perforated flame holder 302. The control circuit 430 can be configured to control the heating apparatus 428 responsive to input from the sensor 434. Optionally, a fuel control valve 436 can be operatively coupled to the controller 430 and configured to control a flow of fuel to the fuel and oxidant source 402. Additionally or alternatively, an oxidant blower or damper 438 can be operatively coupled to the controller 430 and configured to control flow of the oxidant (or combustion air).

The sensor 434 can further include a combustion sensor operatively coupled to the control circuit 430, the combustion sensor being configured to detect a temperature, video image, and/or spectral characteristic of a combustion reaction held by the perforated flame holder 302. The fuel control valve 436 can be configured to control a flow of fuel from a fuel source to the fuel and oxidant source 402. The controller 430 can be configured to control the fuel control valve 436 responsive to input from the combustion sensor 434. The controller 430 can be configured to control the fuel control valve 436 and/or oxidant blower or damper 438 to control a preheat flame type of heater 428 to heat the perforated flame holder 302 to an operating temperature. The controller 430 can similarly control the fuel control valve 436 and/or the oxidant blower or damper 438 to change the fuel and oxidant mixture 406 flow responsive to a heat demand change received as data via the data interface 432.

Figure 8A:
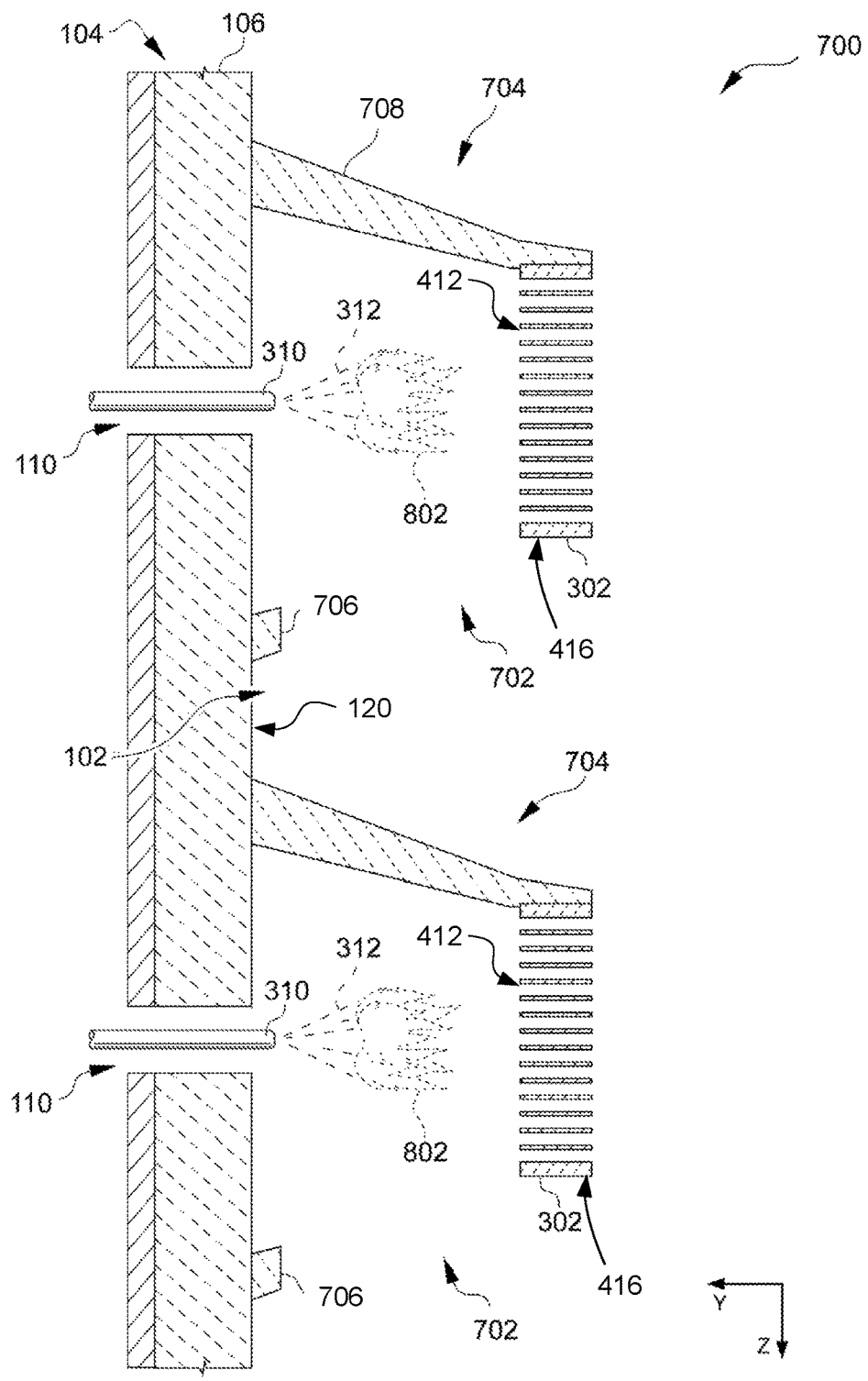
FIGS. 8A and 8B are side-sectional diagrams of the portion of the furnace wall shown in FIG. 7, during respective modes of operation, taken along lines 8-8 of FIG. 7, according to embodiments.
Figure 8B:
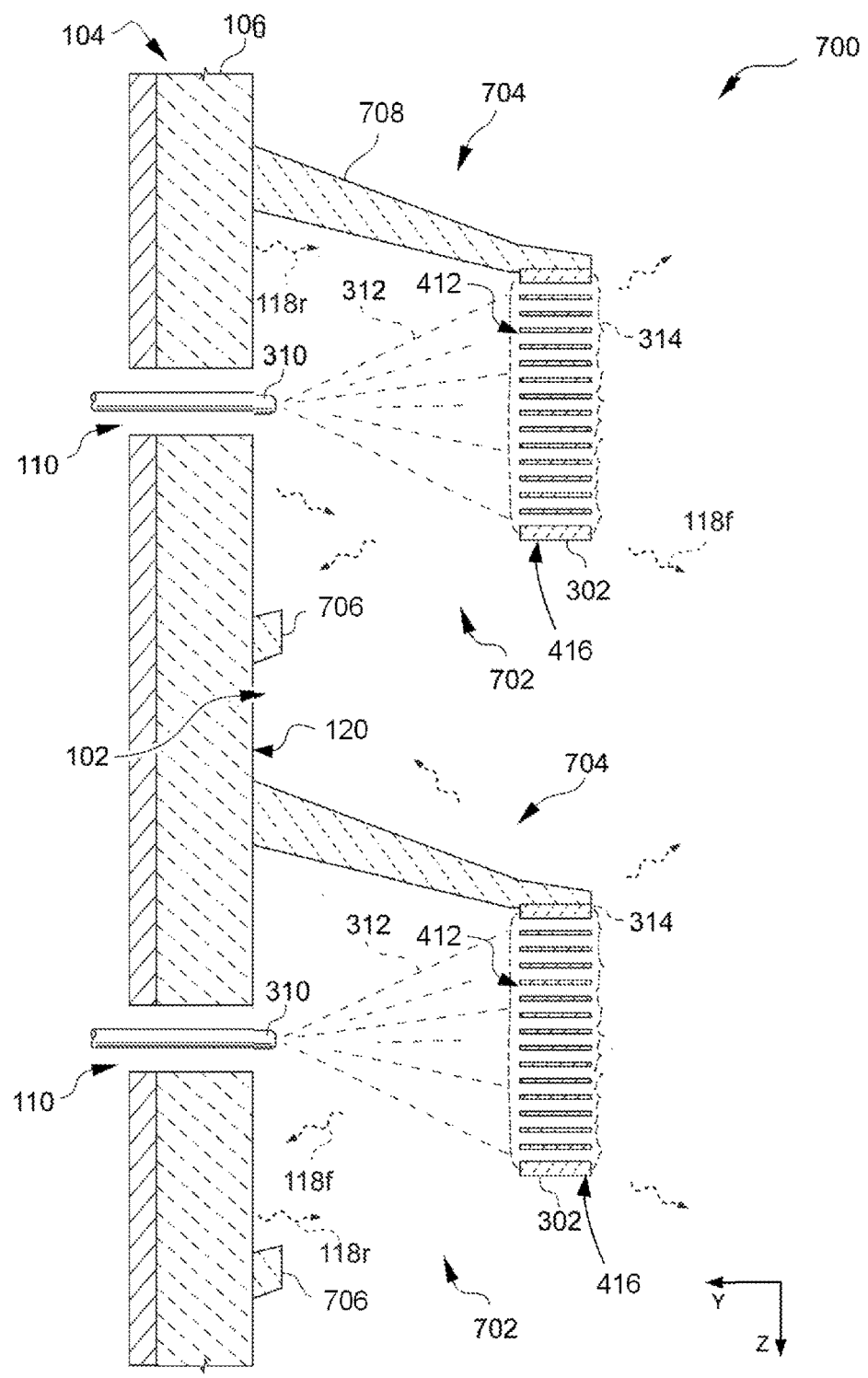

FIGS. 7, 8A and 8B show respective views of a cracking furnace 700, according to an embodiment. FIG. 7 is a perspective view of a portion of a wall 104 of the cracking furnace 700, while FIGS. 8A and 8B are side-sectional diagrams of the same portion of the furnace 700, during respective modes of operation, taken along lines 8-8 of FIG. 7. As shown, the furnace 700 includes a plurality of wall burners 702, each having a perforated flame holder 302 that is spaced away from the inner face 120 of the wall 104. The perforated flame holders 302 are arranged in a substantially planar array that lies substantially parallel to the inner face 120 of the wall 104. Each of the plurality of wall burners 702 also includes a nozzle 310 configured to emit a fuel stream 312 toward an input face 412 of the respective perforated flame holder 302.

The nozzles 310 of the wall burners 702 shown in FIG. 7 may be divided into a first plurality of fuel nozzles and a second plurality of fuel nozzles, for example, by dividing the wall burners 702 into two sets by a line parallel to the X-axis (or a Y-X plane, lying between the upper and lower sets in the Z direction). Each plurality of fuel nozzles may, in an embodiment, correspond to a respective stable and self-sustaining combustion reaction, as shown in FIG. 8B and as discussed below. Thus, the first plurality of fuel nozzles and the second plurality of fuel nozzles may correspond respectively to first plurality of combustion reactions and to a second plurality of combustion reactions.

According to the embodiment shown, each of the perforated flame holders 302 is held in position by a perforated flame holder support structure 704 that includes a base 706 coupled to the wall 104, and arms 708 extending from the base 706, configured to securely hold the flame holder 302 at the peripheral surface 416. The perforated flame holder support structure 704 is preferably made of a refractory material, such as, e.g., a refractory ceramic or superalloy, etc.

The base 706 of the perforated flame holder support structure 704 can be coupled to the wall 104 by any adequate means, including, for example, mechanical fasteners extending into or through appropriately positioned apertures 110 in the wall 104, and refractory adhesives and cements.

In the embodiment shown, each of the perforated flame holder support structures 704 has three arms 708, as shown, particularly, in FIG. 7. Other embodiments have different numbers of arms, such as, e.g., four, five, and six. According to further embodiments, the perforated flame holders 302 are supported by structures that are not shown in detail here. For example, according to an embodiment, a plurality of flame holders 302 are coupled together by interconnecting rods to form an array that is hung from an upper support, so as to have little or no physical contact with the wall 104, and particularly the inner face 120.

As explained in some detail above, when initially beginning operation, from a cold condition, of a burner system that includes a perforated flame holder 302, it may be preferable to preheat the flame holder 302 during a start-up operation, prior to transitioning to normal operation. FIG. 8A shows wall burners 702 during a start-up procedure of the furnace 700, according to an embodiment, while FIG. 8B shows the burners during normal operation of the furnace 700, according to respective embodiments.

According to an embodiment, during a start-up procedure, volume and pressure of the fuel streams 312 are selected to produce a condition in which fuel stream velocity is no greater than flame propagation speed at a distance from the nozzles 310 that is within the lean-to-rich combustion limit range. A stable preheat flame 802 is ignited at each of the burners 702 and supported within the fuel streams 312, as shown in FIG. 8A. Heat produced by the preheat flame 802 flows outward to the respective flame holders 302, which are heated thereby. When the temperature of at least a portion of each of the perforated flame holders 302 has reached a start-up temperature, the volume and pressure of the fuel streams 312 are brought up to normal operating levels, which causes the fuel stream velocity to also increase, until the preheat flames 802 are blown out or lifted to the flame holders 302. The start-up temperature is selected to be sufficiently high as to initiate and sustain auto-combustion of the fuel stream 312 as it enters the flame holders 302, for at least long enough for stable and self-sustaining combustion reactions to be established, as shown in FIG. 8B.

The start-up procedure described above is provided as an illustrative example, but is only one of many start-up procedures that can be practiced, according to various embodiments. Other examples can be found in PCT Patent Application No. PCT/US2014/016622, entitled "STARTUP METHOD AND MECHANISM FOR A BURNER HAVING A PERFORATED FLAME HOLDER," filed Feb. 14, 2014; which is incorporated herein by reference in its entirety.

It can be seen that the structure of the wall 104 as shown in FIGS. 3 and 7-8B is substantially similar to that of the wall 104 of FIG. 1. Thus, in many cases, existing furnace systems can be retrofitted to operate according to principles of the invention simply by removing existing wall burner structures and replacing them with flame holders and other structures configured to operate as described herein.

Of course, no effort has been made to describe all of the many known furnace systems to which the principles of the present disclosure might be advantageously applied. Some systems may require more modifications than others for such a conversion.

Figure 2:
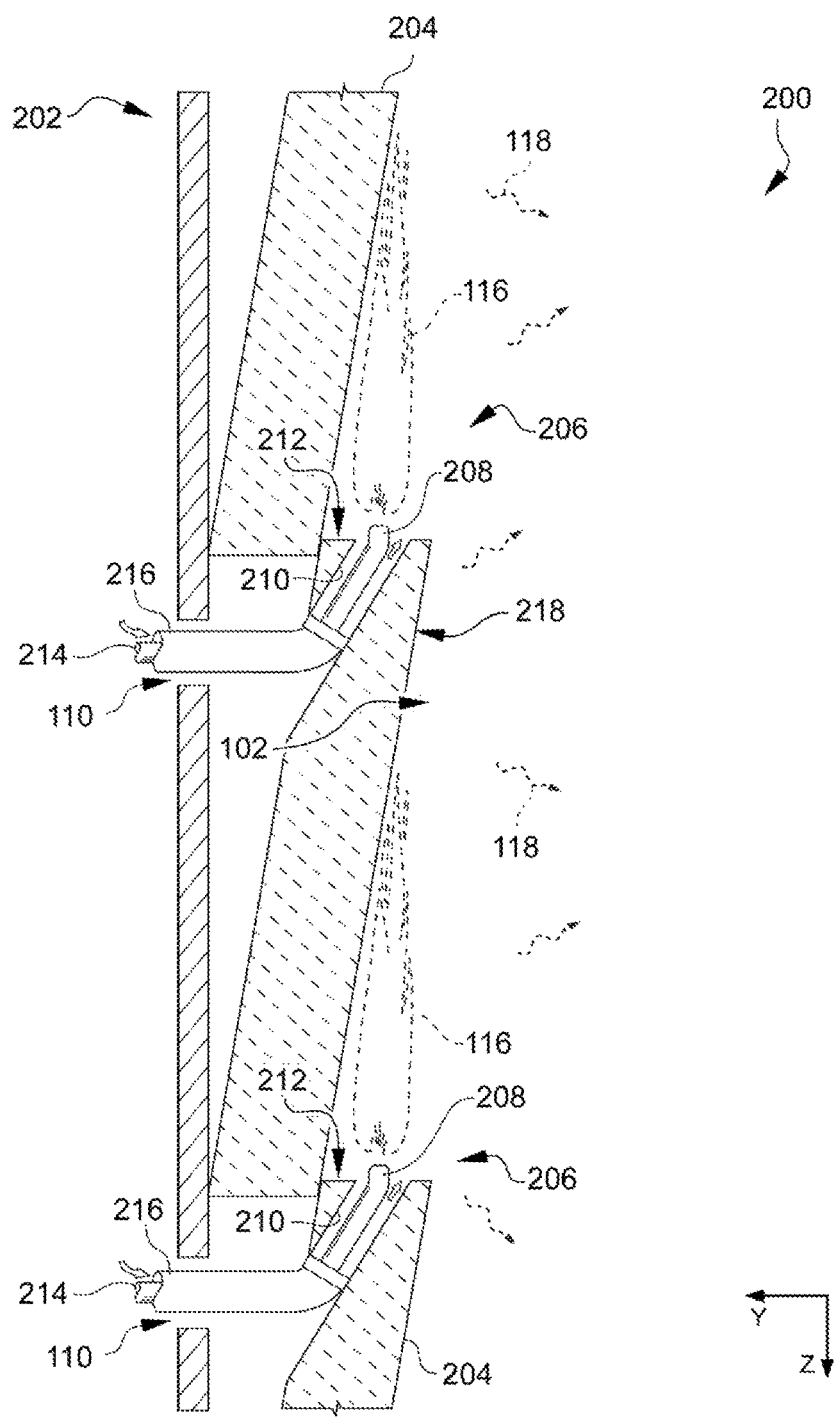
FIG. 2 is a side view of a portion of a cracking furnace of another design, according to known principles.
Figure 9:
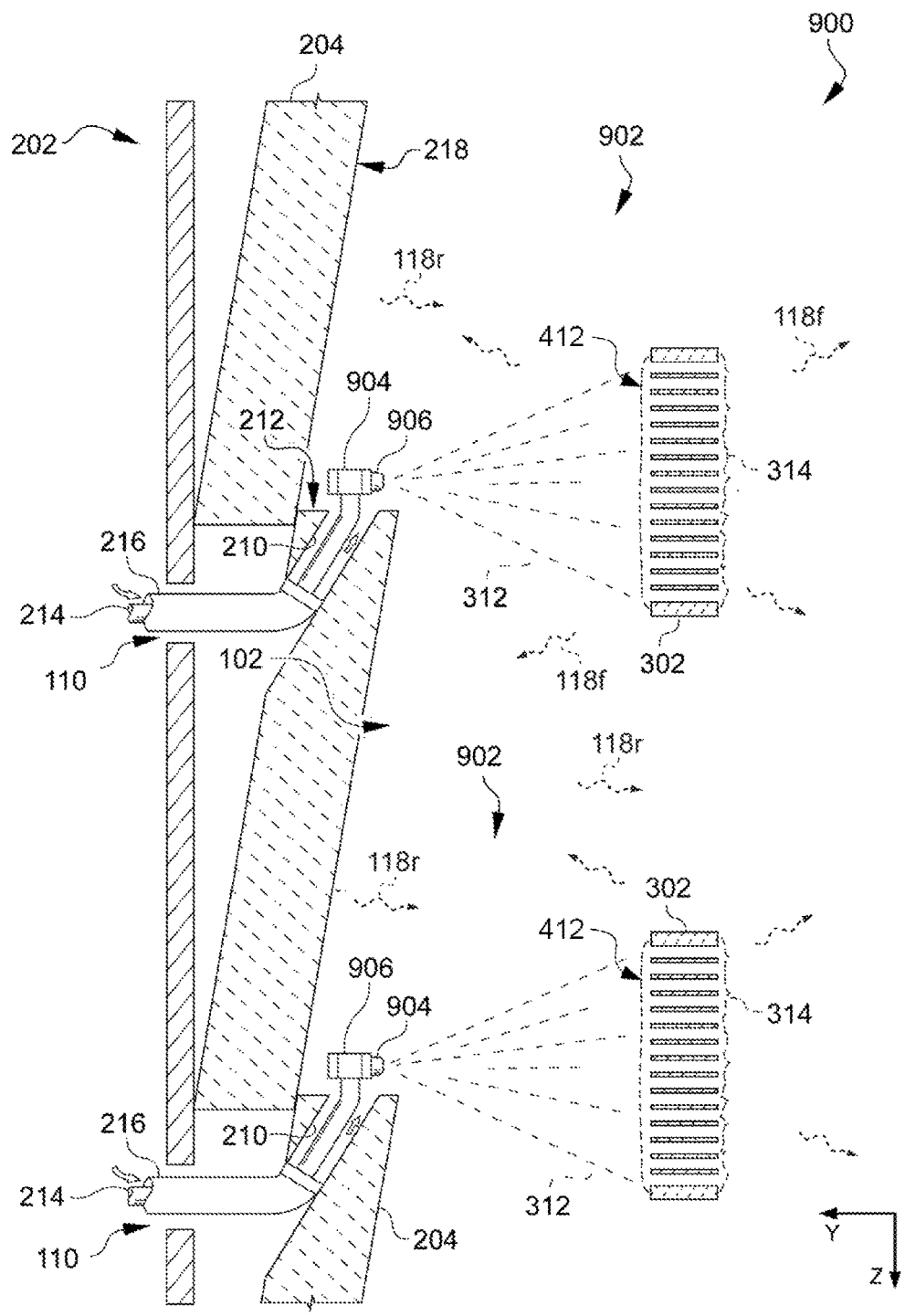
FIG. 9 is a side-sectional diagram of a portion of a cracking furnace, illustrating a retrofit of a furnace of the type shown in FIG. 2, according to an embodiment.

FIG. 9 is a side-sectional diagram of a portion of a cracking furnace 900, illustrating a retrofit of a furnace of the type shown in FIG. 2, according to an embodiment. As with other disclosed embodiments, the furnace 900 includes wall burners 902 with perforated flame holders 302, spaced away from the wall 202 with their input faces 412 lying generally parallel to the wall 202, in aggregate, although not necessarily parallel to each of the inner faces 218 of the refractory panels 204. In the pictured embodiment, much of the original burner structure is retained. However, the original nozzle tip of each wall burner 902 has been replaced with an adaptor tip 904 that includes a redirected nozzle 906, configured to emit a fuel stream 312 toward the input face 412 of the respective perforated flame holder 302.

According to other embodiments, assuming a similar wall structure, the entire original nozzle assembly may be removed and replaced with nozzles of more conventional designs. According to an embodiment, the nozzle 208 and the fuel and air conduits 214, 216 are removed, and the angled portions 210 of the apertures 110 are filled with a refractory cement or filler. The apertures 110 are extended by boring substantially straight through the refractory panels 204 to accommodate nozzles of a type described herein, or other appropriate nozzle assemblies, and the positions of the perforated flame holders 302 are selected to place them directly opposite respective ones of the nozzles.

While flame holder support structures are not shown in the embodiment of FIG. 9, various structures can be employed. For example, a support structure may be purpose-designed and built, to support the flame holders 302, configured to be coupled, e.g., to the top surface 212 of the refractory panels 204. In another example, the flame holders 302 can be coupled together by interconnecting rods in an array, and hung from an upper support, as previously described.

Figure 10:
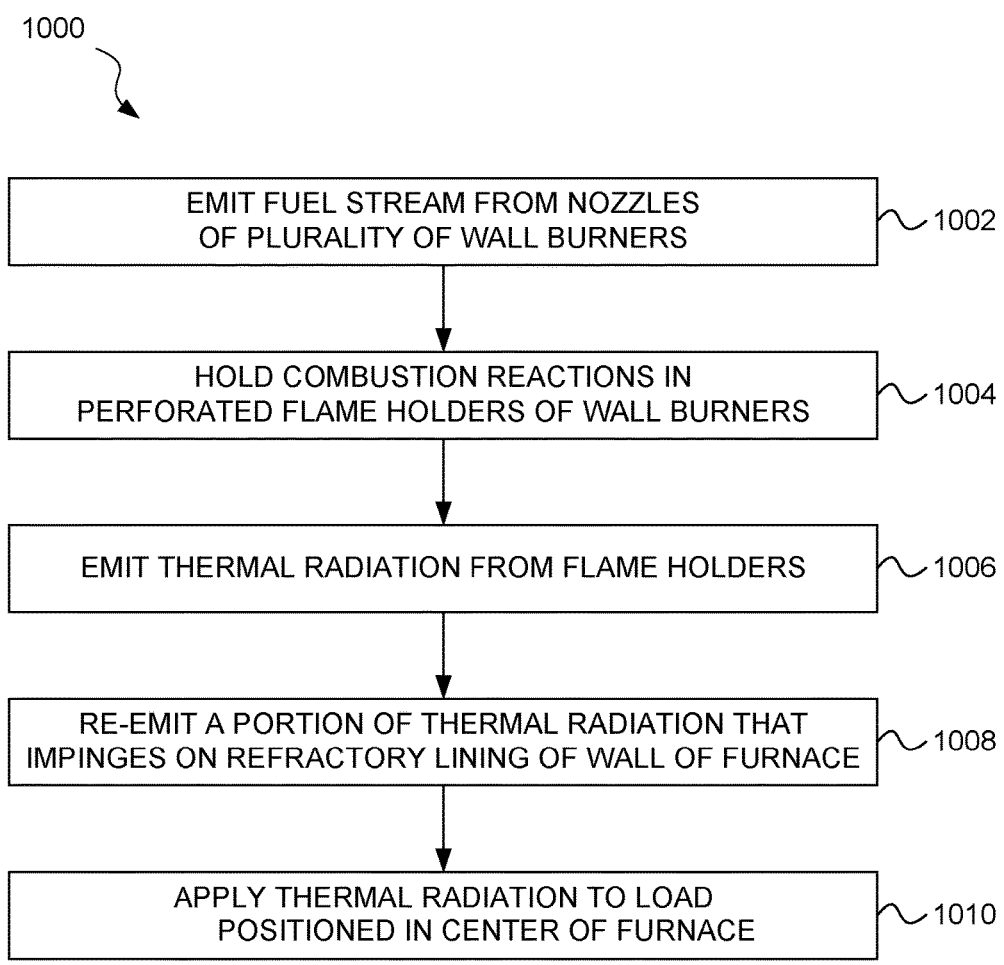
FIG. 10 is a flow chart illustrating a method of operation of a cracking furnace of the type described herein, according to an embodiment.

FIG. 10 is a flow chart illustrating a method of operation 1000 of a cracking furnace of the type described herein, according to an embodiment.

In step 1002, fuel streams are emitted from the nozzle of each of a plurality of wall burners. In step 1004, the fuel streams support respective combustion reactions, which are held substantially within the apertures of the perforated flame holders. Energy released by the combustion reactions is emitted, in step 1006, from the flame holder as thermal radiation. The radiative flux may vary from the sides of the flames holders, relative to the faces, or from the input face to the output face, etc. Generally, radiation is maximum from about 10 degrees to about 60 degrees off-axis with respect to an axis normal to the input face and output face of the perforated flame holders.

Some of the thermal radiation (e.g., substantially all of the thermal radiation from the input face of each flame holder) impinges upon the refractory lining of the furnace. Upon reaching a steady state temperature, most of the radiation output from the perforated flame holder to the refractory lining of the furnace is re-emitted, in step 1008, as thermal radiation from the refractory lining of the furnace, back toward the interior of the combustion volume. Finally, in step 1010, thermal radiation is applied to the load, thereby heating the load, which undergoes cracking, or a similar other chemically active process.

It is well known in the art that radiation intensity, or strength, diminishes in inverse proportion to the square of the distance from the source of the radiation (inverse square law). Thus, in the case of thermal radiation emitting from a planar surface, the greatest amount of thermal energy impinging on a given point on a load will be from the point on the surface closest to that load point, i.e., the point at which a line extending from the load point to the surface is normal to the surface. Conversely, the greater the angle, relative to a surface normal, between a point on the load and a point on the surface, the lower the amount of thermal energy that will impinge on the load point from the point on the surface.

Figure 11:
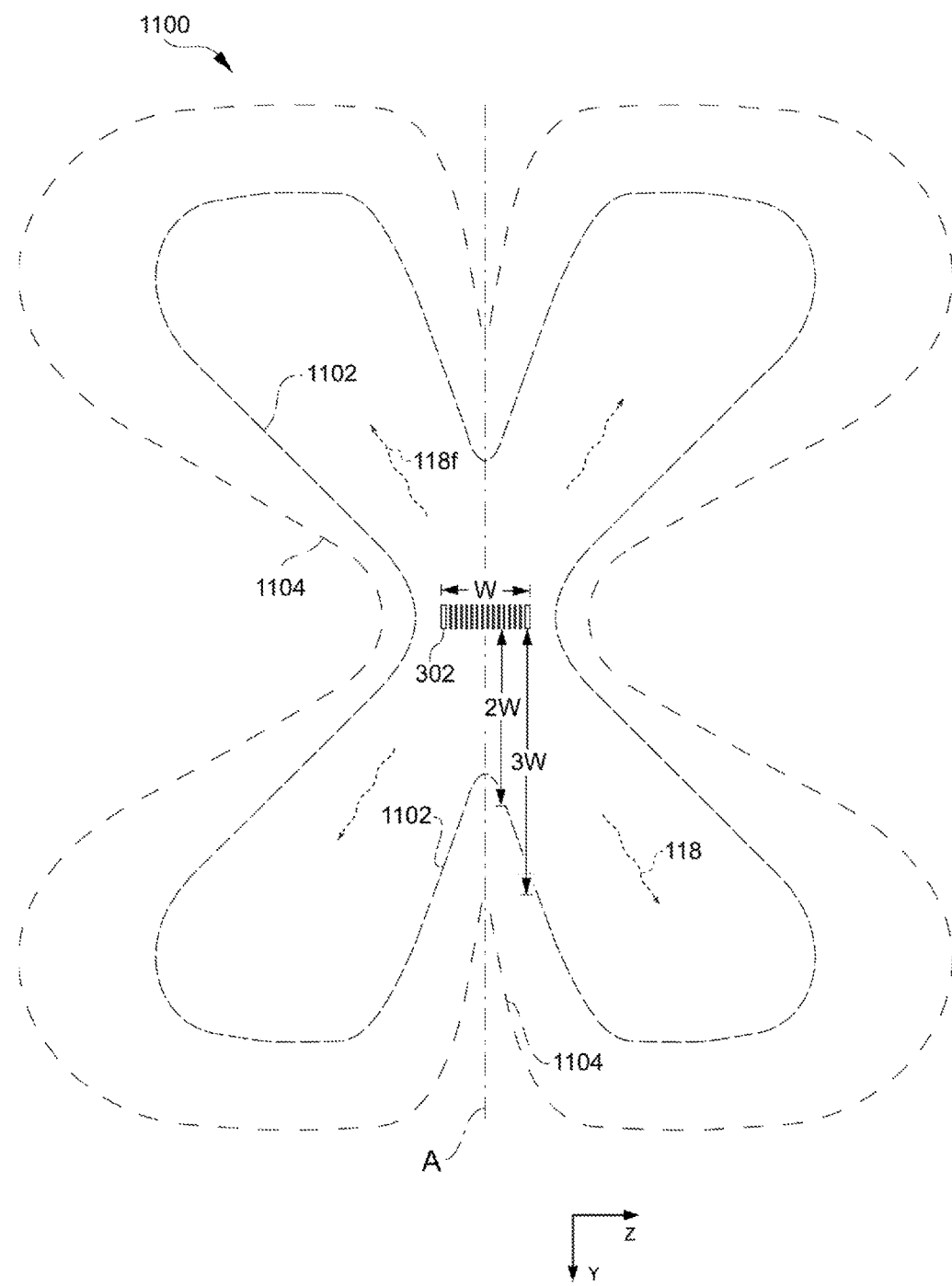
FIG. 11 is a diagram showing the distribution of thermal radiation from a perforated flame holder of the type shown and described with reference to FIGS. 3-9, according to an embodiment.

Surprisingly, the inventors have found that the well understood principles outlined above do not generally apply to the emission profile of the input and output faces of a perforated flame holder of the type described herein. Referring to FIG. 11, a diagram 1100 shows the emission profile of a perforated flame holder 302 of the type shown and described with reference to FIGS. 3-9, according to an embodiment. Only the flame holder 302 is shown in FIG. 11; other elements and features that would be present during normal operation are omitted for clarity.

An axis A is shown, extending through a center of the flame holder 302 and normal to the input and output faces 412, 414. Hereafter, unless otherwise specified, angles noted will be relative to the axis A. The width dimension W refers to the distance across the flame holder 302 between opposite sides of the peripheral surface 416. In embodiments in which the flame holder 302 is circular in plan view, the width W defines the diameter of the flame holder. In such cases, the emission profile will be radially symmetrical. In embodiments in which the flame holder 302 is square, rectangular, or some other non-circular shape, the particular profile will depend upon the shape, dimensions, and plane in which the profile is viewed, but will, in side view, generally resemble the profile shown in FIG. 11. Various distances are defined below with reference to the width W of the flame holder 302, e.g., 2W, referring to a distance of two times the width W, etc. In the embodiment shown, the emission profile is vertically symmetrical, meaning that thermal radiation 118$f$ emitted by the input face 412 is about equal to, and substantially mirrors thermal radiation 118$f$ emitted by the output face 414. This symmetrical relationship is not essential, and in some embodiments may not be present. However, for the present description, it is simplest to describe and understand.

During normal operation, according to an embodiment, most of the thermal radiation 118f produced by the flame holder 302 is emitted by the input and output faces 412, 414 along vectors lying between about 10 degrees and 60 degrees (relative to the axis A), and most strongly between about 20 degrees and 45 degrees. In the example of the flame holder 302 of FIG. 11, a first emission region 1102 of maximum flux density is produced by thermal radiation 118f emitted by the flame holder 302 at angles of between about 20 and 45 degrees. A second emission region 1104 of appreciable flux density is produced by thermal radiation 118f emitted by the flame holder 302 at angles of between about 10 and 60 degrees.

The term flux density is used here to refer to a quantity of thermal radiation passing through a nominal point within a volume. Reference to the flux density within a particular region, without further detail, can be understood as referring to an average value of the flux density throughout that region. Where the flux density of two or more particular areas or regions are compared, the comparison can be with respect to thermal radiation 118f passing through identically dimensioned volumes, an average of thermal energy flux per unit of volume, etc. Of course, there is typically a direct correlation between a value of flux density at a given location and a value of thermal energy incident upon an object or surface positioned at that location.

The term appreciable flux density refers to a level of flux density that is useful, within the context of a given application or system. This can mean a level that exceeds a selected threshold value, or that is commercially viable, or that is capable of transmitting sufficient thermal energy to a load to offset efficiency losses or the cost of its collection, etc. Accordingly, the appreciable flux density value may vary according to the type and efficiency of the associated system, the total thermal output of the system, the commercial value of products produced by the system, etc.

Maximum flux density is used to refer to a region within which an average flux density value is greater, by a selected factor, than an average flux density value of, for example, the remainder of the second emission region of appreciable flux density. Selection of that factor is a design consideration, but can be, for example, two, or three, or ten, etc. The selected factor may even be one, or unity, meaning that the first and second emission regions are coextensive. This may be the case, for example, in an embodiment in which only one specific threshold of flux density strength is of interest to the designer, even though gradients of strength within a general range of "appreciable" flux density may be a consideration.

Furthermore, the angles shown and described with reference to FIG. 11 are merely examples. These angles can vary significantly, depending on a number of factors, including, for example, the size, shape, and pitch of the apertures 110 (see FIG. 5), the shape and void fraction of the flame holder 302, etc. Thus, the shape of the first and/or second emission regions 1102, 1104 of maximum flux density and appreciable flux density may vary for any given flame holder and system, not only because the actual value of flux density can vary from one flame holder or system to another, but also because the values that qualify as maximum or appreciable can also vary according to criteria that are unrelated to the physical characteristics of the flame holder.

Finally, it will be recognized that flux density varies at different points, within both the first emission region 1102 and the second emission region 1104. For example, within the second emission region 1104 of appreciable flux density, flux density is typically at a minimum at the line that defines the second emission region 1104, and increases toward the line that defines the boundaries of the first emission region 1102. Within the first emission region 1102 of maximum flux density, flux density is at a minimum at the boundary line, and is greater at locations that are more distant from the boundary line.

Because there is very little thermal radiation 118f emitted normal to the input and output faces 412, 414 of the flame holder 302—i.e., parallel to the axis A—thermal flux density along the axis A drops off with distance more quickly than in surrounding areas. In the example of FIG. 11, the axis A intersects the line defining the first emission region 1102 at a distance of less than 2W from the input and output faces 412, 414, while the first emission region 1102 extends well beyond that distance on either side, diminishing in accordance with the inverse square law. Likewise, axis A intersects the outer edge of the second emission region 1104 at a distance of about 3W from the input and output faces 412, 414, while the second emission region 1104 extends much further, off-axis. On the other hand, flux density can be very high along the axis A at distances of less than about 1.5W from the input and output faces 412, 414.

Figure 12:
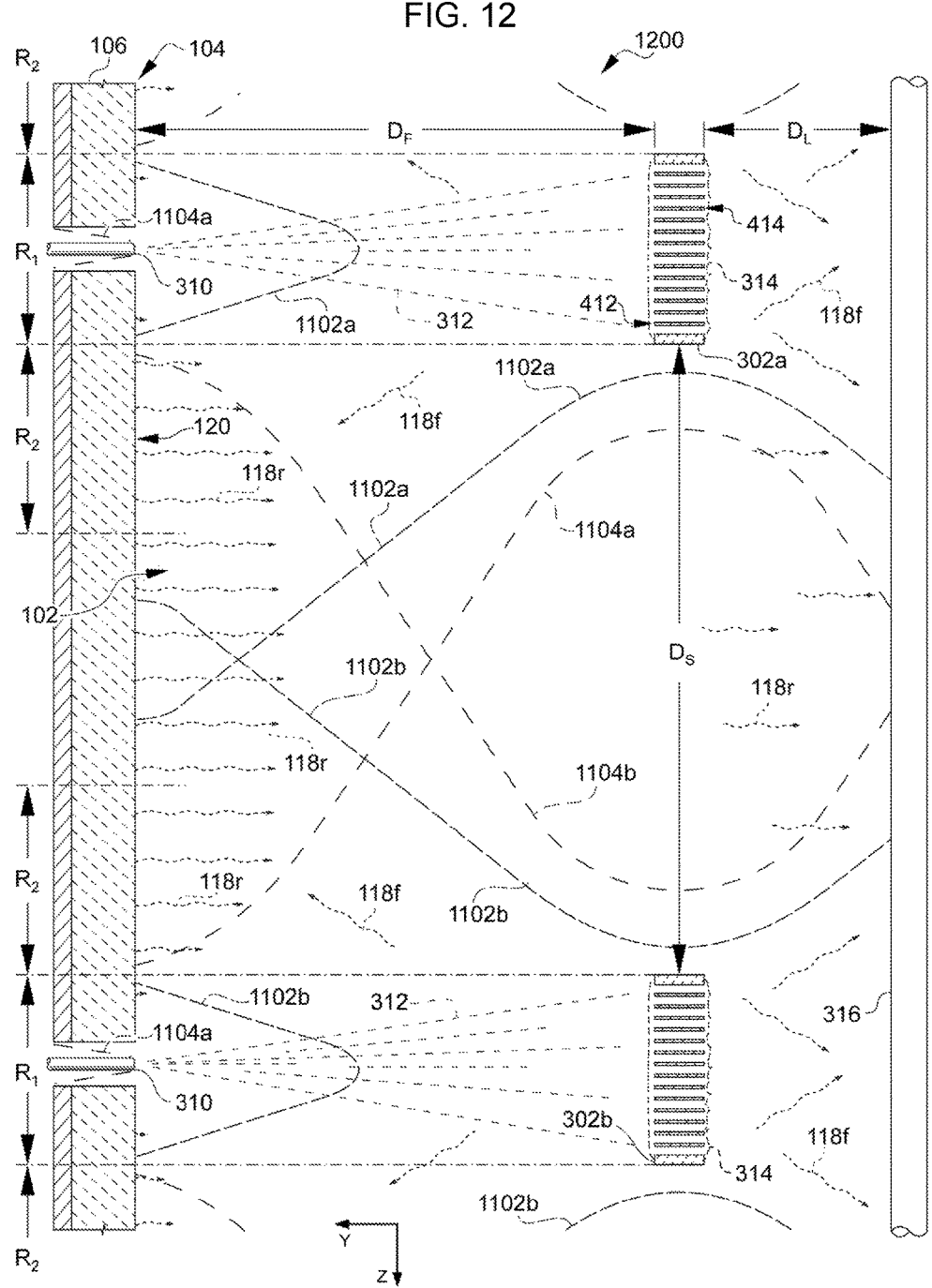
FIG. 12 is a side-sectional diagram of a portion of a cracking furnace, similar to those described with reference to FIGS. 3, and 7-9, showing the distribution of thermal radiation within the furnace, according to an embodiment.

FIG. 12 is a side-sectional diagram of a portion of a cracking furnace 1200 similar to those described with reference to FIGS. 3 and 7-9, showing the distribution of thermal flux density within the furnace 1200, according to an embodiment. The furnace 1200 includes a plurality of perforated flame holders 302, of which first and second perforated flame holders 302a, 302b are shown, together with other elements substantially as described with reference to other embodiments. The first and second flame holders 302a, 302b are separated from each other by a distance $D_S$. Input faces 412 of the first and second flame holders 302a, 302b are separated from the inner face 120 of the refractory lining 106 by a distance $D_F$, while the output faces 414 are separated from the load 316 by a distance $D_L$.

First and second wall regions $R_1$, $R_2$ of the inner face 120 of the wall 104 are delimited in FIG. 12 by projection lines extending through the wall 104. The first wall regions $R_1$ define the portions of the inner face 120 that lie directly opposite the input face 412 of each of the plurality of flame holders 302, while the second wall regions $R_2$ surround the respective first wall regions $R_1$, and extend outward from the first wall regions. In the embodiment shown, the second wall regions $R_2$ extend outward from the first wall regions $R_1$ a distance equal to about 1W.

Where the term directly opposite is used to refer to a location relative to a face of a flame holder, the term refers to a projection by a vector normal to the particular face. For example, as noted above, the first wall regions $R_1$ of the inner face 120 lie directly opposite the input face 412 of the first perforated flame holder 302a, and are thus defined by a projection onto the inner face 120 of the wall 104 by a vector normal to the input face 412 of the first flame holder, as shown in FIG. 12.

First emission regions 1102a, 1102b of maximum flux density of, respectively, the first and second flame holders 302a, 302b are depicted within the portion of the furnace 1200 that is shown, as are the second emission regions 1104a, 1104b of appreciable flux density. The first and second emission regions 1102a, 1102b, 1104a, 1104b of flux density substantially correspond to those described above with reference to FIG. 11, and are shown to provide a general indication of the relative strength of thermal energy impinging on the inner face 120 and the load 316, according to an embodiment.

In the furnace 1200 of FIG. 12, a portion of the thermal radiation 118*f* emitted by the input faces 412 of the first and second flame holders 302*a*, 302*b* impinges on the inner face 120 of the refractory lining 106. Where significant radiation 118*f* impinges, the inner face 120 is heated to an incandescent temperature and itself emits thermal radiation 118*r*. However, the material of the refractory lining 106 is typically selected to be a poor thermal conductor, meaning that very little thermal energy is transmitted by conduction laterally within the lining material. This, in turn, means that thermal radiation 118*r* is emitted most strongly from the portions of the inner face 120 that are most strongly irradiated by thermal radiation 118*f*.

In the embodiment of FIG. 12, the distance $D_F$ is selected to place the first wall regions $R_1$ of the inner face 120 substantially outside the first emission regions 1102*a*, 1102*b*, and to place the nozzles 310 themselves outside of, or very nearly outside of the second emission regions 1104*a*, 1104*b*. For example, in the embodiment shown, the distance $D_F$ is selected to be greater than 2W, and, preferably, at least about 3W. Thus, very little thermal radiation 118*f* impinges on the inner face 120 within the first wall regions $R_1$, and little or no appreciable radiation 118*f* from the flame holders 302 impinges on the nozzles 310. Consequently, the nozzles 310 are not significantly heated by thermal radiation 118*f*, and little radiation 118*r* is emitted by the first wall regions.

According to various embodiments, the distance $D_F$ is selected such that, during normal operation of the furnace 1200, an average strength of thermal radiation 118*f* impinging, per unit of surface area, on the first wall regions $R_1$ of the inner face 120 is significantly less than an average strength of radiation 118*f* impinging on the second wall regions $R_2$.

For example, according to an embodiment, the average strength of thermal radiation 118*f* impinging, per unit of surface area, on the second wall regions $R_2$ is at least twice the average strength of thermal radiation 118*f* impinging on the first wall regions $R_1$. According to another embodiment, the average strength of thermal radiation 118*f* impinging, per unit of surface area, on the second wall regions $R_2$ is at least three times the average strength of thermal radiation 118*f* impinging on the first wall regions $R_1$. According to a further embodiment, the average strength of thermal radiation 118*f* impinging, per unit of surface area, on the second wall regions $R_2$ is at least an order of magnitude greater than the average strength of thermal radiation 118*f* impinging on the first wall regions $R_1$.

Although the outlets of the nozzles 310 are shown in FIG. 12 as being substantially in a plane defined by the inner face 120, they can be positioned on either side of that plane. For example, if it is desirable to reduce air entrainment by the fuel streams 312, the nozzles 310 can be positioned to extend beyond the inner face 120, with outlets positioned closer to the flame holders 302, in order to reduce the dilution distance $D_D$ (see FIG. 4).

In the embodiment of FIG. 12, the distance $D_S$ is selected such that, along the plane defined by the inner face 120, there is significant overlap of the second emission regions 1104*a* and 1104*b* and some overlap of the first emission regions 1102*a* and 1102*b*. On the other hand, little, if any, of the thermal radiation 118*f* from the first flame holder 302*a* impinges on the first wall region $R_1$ lying opposite the second flame holder 302*b*, nor vice-versa. Thus, the portion of the inner face 120 that lies between the flame holders 302*a*, 302*b* is heated very strongly by the thermal radiation 118*f* from both flame holders, while the first wall regions $R_1$, directly opposite the flame holders, remain substantially unheated. Furthermore, although the strength of the radiation 118*f* that impinges on the inner face 120 varies from one position to another, the overlapping, particularly, of the first emission regions 1102*a*, 1102*b*, where the radiation strength of each begins to drop off, results in a substantially even distribution of thermal energy on the inner face 120 between the flame holders 302*a*, 302*b*, and a correspondingly even distribution of thermal radiation 118*f* from the inner face 120 in those areas.

Selection of the distance $D_S$ may be influenced by factors such as, for example, the emission profiles of the particular flame holders 302*a*, 302*b*, the distance $D_F$ between the input faces 412 of the flame holders 302*a*, 302*b* and the inner face 120, a desired emission profile of the inner face 120, etc.

Turning now to the output side of the first and second perforated flame holders 302*a*, 302*b*, according to an embodiment, the distance $D_L$ is selected to place the load 316 within the first emission region 1102 of maximum flux density along the entire portion that is opposite each of the flame holders 302*a*, 302*b*. For example, in the embodiment shown, the distance $D_L$ is selected to be less than 2W, and preferably less than about 1.5W. At the distance $D_L$, the strength of the thermal radiation 118*f* impinging on the portions of the load 316 that are opposite the first and second perforated flame holders 302*a*, 302*b* is relatively even. The strength of the thermal radiation 118*f* impinging on the load 316 diminishes significantly between the flame holders 302*a*, 302*b*.

As noted above, the thermal radiation 118*f* emitted by the input faces 412 of the plurality of flame holders—including the first and second flame holders 302*a*, 302*b*—is most strongly emitted off axis, impinging on the portions of the inner face 120 that lie between the flame holders. Unlike the flame holders 302*a*, 302*b*, the refractory lining 106 of the wall 104 emits radiation 118*r* in the more typical pattern. This means that an object spaced away from the wall 104 will receive the largest quantity of thermal energy from thermal radiation 118*r* emitted along axes normal to the surface 120, regardless of the distance between the object and the inner face 120. Thus, thermal radiation 118*r* emitted by the inner face 120 of the wall 104 impinges most strongly on portions of the load 316 that receive relatively little thermal radiation 118*f* from the output faces 414 of the flame holders 302. By selection of parameters such as the distances $D_F$, $D_L$, and $D_S$, characteristics and emission profiles of the flame holders 302, nozzle position, fuel output, etc., the combination of thermal radiation 118 from the output faces 414 and the inner face 120 can be controlled to produce a substantially even distribution of thermal energy delivered to the load 316 along its entire length.

Embodiments of the present disclosure provide a number of advantages over many other known systems. Those advantages can include some or all of the following: Thermal energy is more evenly distributed than in conventional systems. This means that positioning the load close to the flame holders and wall will typically result in fewer hot and cold spots along the length of the load than would be found in a conventional system at a comparable distance, enabling, in turn, greater temperature control and faster processing rates, as well as a smaller footprint of the furnace, for a given processing capacity. Because perforated flame holders are configured to substantially contain the flame, there is little or no danger of flame impingement on the load or other furnace components, thereby reducing maintenance and premature failure of furnace components. This also permits the placement of the load closer to the flame holders and/or the furnace wall than would be advisable in a conventional system. Perforated flame holders 302 are more energy efficient than conventional burner systems, reducing fuel consumption and operating costs. Perforated flame holders 302 are also cleaner burning than conventional systems, reducing or eliminating the need for expensive pollution control measures. Additional advantages may also be provided, depending upon the particular system design.

The term substantially even is used to describe or define a distribution of thermal energy over a specified area, e.g., a portion of a wall surface, load, etc., and refers to a value that varies from an average, over the specified area, by less than a factor of two.

Axes X, Y, and Z are provided in the drawings for clarity in comparing features shown in different drawings. However, this is not to be construed as suggesting that structures on which the claims read must be oriented as shown in the drawings. As previously noted, some furnace designs include burners positioned on floors and ceilings of furnaces, as well as vertical walls. Accordingly, unless defined otherwise, the claims can be read on any structure that otherwise conforms to the claim language, without regard to its orientation. Furthermore, the term wall is not limited to a surface or structure that includes a vertical dimension, but can also read on differently-oriented surfaces, including horizontal surfaces, such as floors and ceilings.

The term fuel stream, as used herein, includes within its scope a stream of fuel that is emitted, for example, from a nozzle, and also to other components of the stream, such as, e.g., oxidizers or diluents that are entrained into the fuel stream after it exits the nozzle.

Ordinal numbers, e.g., first, second, third, etc., are used in the claims according to conventional claim practice, i.e., for the purpose of clearly distinguishing between claimed elements or features thereof. The use of such numbers does not suggest any other relationship, e.g., order of operation or relative position of such elements, etc. Furthermore, an ordinal number used to refer to an element in a claim does not necessarily correlate to a number used to refer to an element in the specification on which that claim reads, nor to a number used in an unrelated claim to designate a similar element or feature.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method of combustion, comprising:
   emitting a fuel stream from each of a first plurality of fuel nozzles toward an input face of a respective one of a first plurality of perforated flame holders positioned in an array lying substantially parallel to and spaced away from a first wall of a combustion volume, the input faces of each of the first plurality of perforated flame holders being positioned facing the first wall;
   holding each of a first plurality of combustion reactions, supported by respective ones of the fuel streams, substantially within pluralities of apertures extending through respective ones of the first plurality of perforated flame holders;
   emitting energy, released by each of the first plurality of combustion reactions, as thermal radiation from respective ones of the first plurality of perforated flame holders;
   increasing a temperature of an inner face of the first wall by receiving thereon a portion of the energy emitted by the first plurality of perforated flame holders; and
   re-emitting a portion of the received energy, as thermal radiation, generally from the inner face of the first wall toward a thermal load positioned in an approximate center of the combustion volume.

2. The method of combustion of claim 1, wherein the increasing a temperature of an inner face of the first wall by receiving thereon a portion of the energy emitted by the plurality of perforated flame holders comprises increasing a temperature of an inner face of a refractory lining of the first wall.

3. The method of combustion of claim 1, wherein the emitting a fuel stream from each of a first plurality of fuel nozzles comprises emitting the fuel stream from each of a first plurality of fuel nozzles extending into the combustion volume via respective nozzle apertures in the first wall.

4. The method of combustion of claim 1, comprising:
   emitting a fuel stream from each of a second plurality of fuel nozzles toward an input face of a respective one of a second plurality of perforated flame holders positioned in an array lying substantially parallel to and spaced away from a second wall of the combustion volume, the second wall facing the first wall;
   emitting energy released by each of a second plurality of combustion reactions as thermal radiation from respective ones of the second plurality of perforated flame holders;
   increasing a temperature of an inner face of the second wall by receiving thereon a portion of the energy emitted by the second plurality of perforated flame holders; and
   re-emitting a portion of energy received by the inner face of the second wall, as thermal radiation, generally from the inner face of the second wall toward the thermal load.

5. The method of combustion of claim 4, comprising:
   transmitting the thermal load, in the form of a fluid, through the combustion volume; and
   increasing a temperature of the thermal load by applying thermal radiation emitted by the first and second pluralities of flame holders and the first and second walls to pipes through which the thermal load is transmitted.

6. The method of combustion of claim 4, comprising cracking a hydrocarbon fluid by transmitting the hydrocarbon fluid through load pipes that are heated by thermal radiation from the first and second pluralities of flame holders and the first and second walls.

7. The method of combustion of claim 1, comprising receiving, on the thermal load, thermal energy emitted by the first plurality of perforated flame holders and from the inner face of the first wall at a strength that is substantially even along a length of the thermal load.

8. The method of combustion of claim 1, wherein the emitting energy as thermal radiation from respective ones of the first plurality of perforated flame holders comprises emitting no appreciable thermal radiation from the input face of each of the first plurality of perforated flame holders at an angle of less than about ten degrees, relative to a vector normal to the respective first face.

9. The method of combustion of claim 8, wherein the emitting energy as thermal radiation from respective ones of the first plurality of perforated flame holders comprises emitting a maximum value of thermal radiation from the input faces of each of the first plurality of perforated flame holders at angles of less than about forty-five degrees and greater than about twenty degrees, relative to a vector normal to the respective face.

10. The method of combustion of claim 1, wherein the emitting energy as thermal radiation from respective ones of the first plurality of perforated flame holders comprises emitting no appreciable thermal radiation from the input face of each of the first plurality of perforated flame holders at an angle of greater than about sixty degrees, relative to a vector normal to the respective first face.

11. The method of combustion of claim 1, wherein the emitting energy as thermal radiation from respective ones of the first plurality of perforated flame holders comprises emitting thermal radiation from the output face of each of the first plurality of perforated flame holders in an emission profile that substantially mirrors an emission profile of the input face of the respective one of the first plurality of perforated flame holders.

12. The method of combustion of claim 1, wherein the increasing a temperature of an inner face of the first wall by receiving thereon a portion of the energy emitted by the first plurality of perforated flame holders comprises:
  receiving, in a first region of the inner face lying directly opposite the input face of a first one of the first plurality of perforated flame holders, thermal radiation having a first average value, per unit of surface area;
  receiving, in a second region contiguous to and surrounding the first region and extending outward from the first region a distance approximately equal to a width of the first one of the first plurality of perforated flame holders, thermal radiation having a second average value, per unit of surface area, the second average value being substantially greater than the first average value.

13. The method of combustion of claim 12, wherein the second average value is greater than the first average value by a factor of at least 2.

14. The method of combustion of claim 12, wherein the second average value is greater than the first average value by a factor of at least 3.

15. The method of combustion of claim 12, wherein the second average value is greater than the first average value by a factor of at least 10.

* * * * *